United States Patent
Xu et al.

(10) Patent No.: US 12,449,528 B2
(45) Date of Patent: Oct. 21, 2025

(54) SIGNAL DETECTION METHOD AND APPARATUS, AND RADAR SYSTEM

(71) Applicant: SHENZHEN YINWANG INTELLIGENT TECHNOLOGIES CO., LTD., Shenzhen (CN)

(72) Inventors: Shaofeng Xu, Xi'an (CN); Qiyong Zhao, Shenzhen (CN); Yutang Zhu, Shenzhen (CN)

(73) Assignee: Shenzhen Yinwang Intelligent Technologies Co., Ltd., Shenzhen (CN)

( * ) Notice: Subject to any disclaimer, the term of this patent is extended or adjusted under 35 U.S.C. 154(b) by 378 days.

(21) Appl. No.: 17/980,359

(22) Filed: Nov. 3, 2022

(65) Prior Publication Data

US 2023/0057115 A1 Feb. 23, 2023

Related U.S. Application Data

(63) Continuation of application No. PCT/CN2021/090870, filed on Apr. 29, 2021.

(30) Foreign Application Priority Data

May 6, 2020 (CN) .......................... 202010371429.7

(51) Int. Cl.
*G01S 13/58* (2006.01)
*G01S 7/35* (2006.01)
*G01S 13/931* (2020.01)

(52) U.S. Cl.
CPC ............ *G01S 13/584* (2013.01); *G01S 7/356* (2021.05); *G01S 13/931* (2013.01)

(58) Field of Classification Search
CPC ...... G01S 13/931; G01S 13/584; G01S 13/18; G01S 7/356; G01S 7/354

(Continued)

(56) References Cited

U.S. PATENT DOCUMENTS 6,822,606 B2 * 11/2004 Ponsford .................. G01S 3/74
342/159
7,057,550 B1 6/2006 Aker
(Continued)

FOREIGN PATENT DOCUMENTS

CN 101470202 A 7/2009
CN 103257346 A 8/2013
(Continued)

OTHER PUBLICATIONS

Extended European Search Report in European Appln No. 21800695. 5, dated Sep. 15, 2023, 7 pages.
(Continued)

*Primary Examiner* — Michael W Justice
(74) *Attorney, Agent, or Firm* — Fish & Richardson P.C.

(57) ABSTRACT

This application provides a signal detection method and apparatus. One example method includes: transmitting, by a first radar, a first sounding signal in a first time period of a first frame; transmitting, by the first radar, a second sounding signal in a second time period of the first frame; receiving, by the first radar, reflected signals corresponding to the first sounding signal and the second sounding signal; and determining, by the first radar, a false alarm target based on a difference between a first distance-velocity spectrum and a second distance-velocity spectrum, wherein the second sounding signal is a signal obtained through first phase code modulation based on the first sounding signal, the first distance-velocity spectrum is obtained based on a first reflected signal corresponding to the first sounding signal, and the second distance-velocity spectrum is obtained based on a second reflected signal corresponding to the second sounding signal.

21 Claims, 12 Drawing Sheets

(58) Field of Classification Search
USPC .................................. 342/195, 14, 112, 115
See application file for complete search history.

(56) References Cited

U.S. PATENT DOCUMENTS

| | | | |
|---|---|---|---|
| 7,477,181 | B2 | 1/2009 | Banaszak et al. |
| 7,916,069 | B2* | 3/2011 | Okunishi .............. G01S 13/937 342/191 |
| 8,169,362 | B2* | 5/2012 | Cook .................... G01S 13/534 342/162 |
| 9,229,102 | B1* | 1/2016 | Wright .................. G01S 13/885 |
| 10,048,353 | B2 | 8/2018 | Vogt et al. |
| 11,054,516 | B2* | 7/2021 | Wu ......................... G01S 7/354 |
| 11,163,053 | B2* | 11/2021 | Shayovitz ............... G01S 7/023 |
| 11,585,892 | B1* | 2/2023 | Spaulding ............. G01S 7/4021 |
| 11,585,919 | B2* | 2/2023 | Gulati .................... G01S 13/343 |
| 11,650,314 | B2* | 5/2023 | Lee ......................... A61B 8/463 600/455 |
| 11,693,085 | B2* | 7/2023 | Meissner ................ G01S 7/023 342/21 |
| 2004/0178951 | A1* | 9/2004 | Ponsford ................... G01S 7/32 342/194 |
| 2006/0220944 | A1 | 10/2006 | Ikeda |
| 2009/0058713 | A1* | 3/2009 | Okunishi .............. G01S 7/2927 342/91 |
| 2009/0091492 | A1* | 4/2009 | Sanyal ...................... G01S 7/36 342/25 C |
| 2011/0025546 | A1* | 2/2011 | Cook ..................... G01S 7/2923 342/162 |
| 2019/0257944 | A1* | 8/2019 | Lee ......................... A61B 8/5276 |
| 2020/0025866 | A1* | 1/2020 | Gulati .................... G01S 13/931 |
| 2020/0124699 | A1* | 4/2020 | Meissner ............ G01S 13/0209 |
| 2020/0142048 | A1* | 5/2020 | Shayovitz ............... G01S 7/023 |
| 2020/0191939 | A1* | 6/2020 | Wu ......................... G01S 7/354 |
| 2022/0307234 | A1* | 9/2022 | Hillier .................. G06V 10/143 |

FOREIGN PATENT DOCUMENTS

| | | |
|---|---|---|
| CN | 105264400 A | 1/2016 |
| CN | 105301591 A | 2/2016 |
| CN | 106646411 A | 5/2017 |
| CN | 107861117 A | 3/2018 |
| CN | 108398684 A | 8/2018 |
| CN | 109085568 A | 12/2018 |
| CN | 109917340 A | 6/2019 |
| CN | 110412568 A | 11/2019 |
| CN | 110531336 A | 12/2019 |
| DE | 102013210256 A1 | 12/2014 |
| EP | 3179266 A1 | 6/2017 |
| JP | 2009074917 A | 4/2009 |
| JP | 2018059813 A | 4/2018 |
| JP | 2019184370 A | 10/2019 |
| WO | 2014125958 A1 | 8/2014 |

OTHER PUBLICATIONS

IEEE Std 1588-2008 (Revision of IEEE Std 1588-2002), "IEEE Standard for a Precision Clock Synchronization Protocol for Networked Measurement and Control Systems, IEEE Instrumentation and Measurement Society," Technical Committee on Sensor Technology (TC-9), Jul. 24, 2008, 289 pages.

International Search Report and Written Opinion in International Appln. No. PCT/CN2021/090870, mailed on Aug. 2, 2021, 19 pages (with English translation).

Office Action in Japanese Appln. No. 2022-567423, mailed on Sep. 26, 2023, 7 pages (with English translation).

Office Action in Korean Appln. No. 10-2022-7042274, mailed on Apr. 18, 2025, 8 pages (with English translation).

* cited by examiner

SIGNAL DETECTION METHOD AND APPARATUS, AND RADAR SYSTEM

CROSS-REFERENCE TO RELATED APPLICATIONS

This application is a continuation of International Application No. PCT/CN2021/090870, filed on Apr. 29, 2021, which claims priority to Chinese Patent Application No. 202010371429.7, filed on May 6, 2020. The disclosures of the aforementioned applications are hereby incorporated by reference in their entireties.

TECHNICAL FIELD

This application relates to the field of radar technology, and in particular, to a signal detection method and apparatus, and a radar system, which may be applied to the autonomous driving or intelligent driving field, or the intelligent control or unmanned transportation field.

BACKGROUND

With the development of radar technologies, a radar anti jamming technology is facing more difficulties. In actual scenarios, there are many working scenarios of a multi-radar network, for example, a target radar in smart transportation radars deployed at a crossroad receives another signal while receiving a transmit signal of a sounding signal transmitted by the target radar. As a result, a false alarm target is formed, a real target cannot be correctly detected by using the target radar, and interference is caused.

For the foregoing problems, a method is to stagger working frequencies of the radars, so that interference signals after frequency mixing fall outside a bandwidth range of a receiver of the radar. However, this manner severely affects a distance resolution of the radar.

Another method is to resolve interference based on time synchronization. However, this solution greatly wastes time resources, prolongs a working period of the radar, and has a limited adjustable time range.

Still another method is to resolve interference based on code division multiple access. This solution suppresses an interference signal (about 10 dB), but cannot totally eliminate the interference and the false alarm, and even increases low noise and raises a side lobe.

Therefore, how to resolve or reduce the interference signal of the radar, determine the false alarm target, and identify the real target is a problem that needs to be solved currently.

SUMMARY

Embodiments of this application provide a signal detection method and apparatus, and a radar system, to determine a false alarm target and identify a real target. This can improve a probability and reliability of detecting the correct target, and implement a high distance resolution at no expense of bandwidth.

According to a first aspect, a signal detection method is provided. The method includes: A first radar transmits a first sounding signal in a first time period of a first frame. The first radar transmits a second sounding signal in a second time period of the first frame. The first radar receives reflected signals corresponding to the first sounding signal and the second sounding signal. The first radar determines a false alarm target based on a difference between a first distance-velocity spectrum and a second distance-velocity spectrum. The second sounding signal is a signal obtained through first phase code modulation based on the first sounding signal. The first distance-velocity spectrum is obtained based on a first reflected signal corresponding to the first sounding signal, and the second distance-velocity spectrum is obtained based on a second reflected signal corresponding to the second sounding signal.

According to the solution provided in this embodiment of this application, the first radar processes the received reflected signals, and compares processing results, to determine the false alarm target, remove the false alarm target, and identify a real target. This can improve a probability and reliability of detecting the correct target, and implement a high distance resolution at no expense of bandwidth.

With reference to the first aspect, in some implementations of the first aspect, the first time period is before the second time period in a time sequence, or the first time period is after the second time period in a time sequence.

With reference to the first aspect, in some implementations of the first aspect, the first time period and the second time period are shorter than or equal to a frame length of the first frame.

With reference to the first aspect, in some implementations of the first aspect, the first sounding signal is the same as a sounding signal transmitted by a second radar in the first time period. The second sounding signal is different from a sounding signal transmitted by the second radar in the second time period. The sounding signal transmitted by the second radar in the second time period is obtained by performing second phase code modulation on the sounding signal transmitted by the second radar in the first time period.

With reference to the first aspect, in some implementations of the first aspect, the method further includes: The first radar receives reflected signals corresponding to sounding signals that are transmitted by the second radar in the first time period and the second time period.

With reference to the first aspect, in some implementations of the first aspect, there are a plurality of second radars.

With reference to the first aspect, in some implementations of the first aspect, the first distance-velocity spectrum is obtained based on the first reflected signal corresponding to the first sounding signal and a reflected signal corresponding to a sounding signal transmitted by at least one second radar in the first time period. The second distance-velocity spectrum is obtained based on the second reflected signal corresponding to the second sounding signal and a reflected signal corresponding to a sounding signal transmitted by the at least one second radar in the second time period.

With reference to the first aspect, in some implementations of the first aspect, the second sounding signal and the sounding signal that is transmitted by the second radar in the second time period are mutually orthogonal or quasi-orthogonal phase code modulation signals.

According to the solution provided in this embodiment of this application, because sounding signals transmitted by different radars in the second time period are mutually orthogonal or quasi-orthogonal phase code modulation signals, this can effectively resolve interference in a multi-radar network, determine a false alarm target, and further improve a probability and reliability of detecting the correct target.

With reference to the first aspect, in some implementations of the first aspect, before the first radar determines the false alarm target based on the difference between the first distance-velocity spectrum and the second distance-velocity spectrum, the method further includes: The first radar performs first dimensional Fourier transform processing on the second reflected signal. The first radar performs, based on a code phase of the second sounding signal, phase code demodulation on the second reflected signal obtained through first-dimensional Fourier transform processing. The first radar performs second-dimensional Fourier transform processing on the second reflected signal obtained through the phase code demodulation, to obtain the second distance-velocity spectrum.

With reference to the first aspect, in some implementations of the first aspect, if the first sounding signal is a signal on which phase code modulation is not performed, before the first radar determines the false alarm target based on the difference between the first distance-velocity spectrum and the second distance-velocity spectrum, the method further includes: The first radar performs first-dimensional Fourier transform processing on the first reflected signal. The first radar performs second-dimensional Fourier transform processing on the first reflected signal obtained through first-dimensional Fourier transform processing, to obtain the first distance-velocity spectrum.

With reference to the first aspect, in some implementations of the first aspect, if the first sounding signal and the sounding signal that is transmitted by the second radar in the first time period are signals on which same phase code modulation is performed, before the first radar determines the false alarm target based on the difference between the first distance-velocity spectrum and the second distance-velocity spectrum, the method further includes: The first radar performs first-dimensional Fourier transform processing on the first reflected signal. The first radar performs, based on a code phase of the first sounding signal, phase code demodulation on the first reflected signal obtained through first-dimensional Fourier transform processing. The first radar performs second-dimensional Fourier transform processing on the first reflected signal obtained through the phase code demodulation, to obtain the first distance-velocity spectrum.

With reference to the first aspect, in some implementations of the first aspect, that the first radar determines the false alarm target based on the difference between the first distance-velocity spectrum and the second distance-velocity spectrum includes: The first radar determines a first target as the false alarm target, where a difference between an energy value of the first target on the first distance-velocity spectrum and an energy value of the first target on the second distance-velocity spectrum is greater than or equal to a first threshold.

According to the solution provided in this embodiment of this application, based on the energy difference between the distance-velocity spectra of the first reflected signal and the second reflected signal, this can resolve interference in a multi-radar network, determine a false alarm target, identify a real target, and further improve a probability and reliability of detecting the correct target.

With reference to the first aspect, in some implementations of the first aspect, the method further includes: performing synchronization on the first sounding signal and the sounding signal that is transmitted by the second radar in the first time period, so that a difference between a transmitting start time of the first sounding signal and a transmitting start time of the sounding signal that is transmitted by the second radar in the first time period is less than or equal to a second threshold.

According to the solution provided in this embodiment of this application, the first sounding signal transmitted by the first radar and the sounding signal transmitted by the second radar in the first time period are synchronized. This can further improve a probability and reliability of detecting the correct target.

With reference to the first aspect, in some implementations of the first aspect, a guard period between the first sounding signal and the second sounding signal is greater than or equal to a third threshold.

According to the solution provided in this embodiment of this application, because the guard period between the first sounding signal and the second sounding signal is greater than or equal to the third threshold, this can further improve a probability and reliability of detecting the correct target.

With reference to the first aspect, in some implementations of the first aspect, duration of the first time period and duration of the second time period are the same or different.

According to a second aspect, a signal detection apparatus is provided. The signal detection apparatus includes: a transmitting unit, configured to transmit a first sounding signal in a first time period of a first frame, and transmit a second sounding signal in a second time period of the first frame; a receiving unit, configured to receive reflected signals corresponding to the first sounding signal and the second sounding signal; and a processing unit, configured to determine a false alarm target based on a difference between a first distance-velocity spectrum and a second distance-velocity spectrum. The second sounding signal is a signal obtained through first phase code modulation based on the first sounding signal. The first distance-velocity spectrum is obtained based on a first reflected signal corresponding to the first sounding signal, and the second distance-velocity spectrum is obtained based on a second reflected signal corresponding to the second sounding signal.

With reference to the second aspect, in some implementations of the second aspect, the first time period is before the second time period in a time sequence, or the first time period is after the second time period in a time sequence.

With reference to the second aspect, in some implementations of the second aspect, the first time period and the second time period are shorter than or equal to a frame length of the first frame.

With reference to the second aspect, in some implementations of the second aspect, the first sounding signal is the same as a sounding signal transmitted by a second radar in the first time period. The second sounding signal is different from a sounding signal transmitted by the second radar in the second time period. The sounding signal transmitted by the second radar in the second time period is obtained by performing second phase code modulation on the sounding signal transmitted by the second radar in the first time period.

With reference to the second aspect, in some implementations of the second aspect, the receiving unit is further configured to: receive reflected signals corresponding to sounding signals that are transmitted by the second radar in the first time period and the second time period.

With reference to the second aspect, in some implementations of the second aspect, there are a plurality of second radars.

With reference to the second aspect, in some implementations of the second aspect, the first distance-velocity spectrum is obtained based on the first reflected signal corresponding to the first sounding signal and a reflected signal corresponding to a sounding signal transmitted by at least one second radar in the first time period. The second distance-velocity spectrum is obtained based on the second reflected signal corresponding to the second sounding signal and a reflected signal corresponding to a sounding signal transmitted by the at least one second radar in the second time period.

With reference to the second aspect, in some implementations of the second aspect, the second sounding signal and the sounding signal that is transmitted by the second radar in the second time period are mutually orthogonal or quasi-orthogonal phase code modulation signals.

With reference to the second aspect, in some implementations of the second aspect, before determining the false alarm target based on the difference between the first distance-velocity spectrum and the second distance-velocity spectrum, the processing unit is further configured to: perform first-dimensional Fourier transform processing on the second reflected signal; perform, based on a code phase of the second sounding signal, phase code demodulation on the second reflected signal obtained through first-dimensional Fourier transform processing; and perform second-dimensional Fourier transform processing on the second reflected signal obtained through the phase code demodulation, to obtain the second distance-velocity spectrum.

With reference to the second aspect, in some implementations of the second aspect, if the first sounding signal is a signal on which phase code modulation is not performed, before determining the false alarm target based on the difference between the first distance-velocity spectrum and the second distance-velocity spectrum, the processing unit is further configured to: perform first-dimensional Fourier transform processing on the first reflected signal; and perform second-dimensional Fourier transform processing on the first reflected signal obtained through first-dimensional Fourier transform processing, to obtain the first distance-velocity spectrum.

With reference to the second aspect, in some implementations of the second aspect, if the first sounding signal and the sounding signal that is transmitted by the second radar in the first time period are signals on which same phase code modulation is performed, before determining the false alarm target based on the difference between the first distance-velocity spectrum and the second distance-velocity spectrum, the processing unit is further configured to: perform first-dimensional Fourier transform processing on the first reflected signal; perform, based on a code phase of the first sounding signal, phase code demodulation on the first reflected signal obtained through first-dimensional Fourier transform processing; and perform second-dimensional Fourier transform processing on the first reflected signal obtained through the phase code demodulation, to obtain the first distance-velocity spectrum.

With reference to the second aspect, in some implementations of the second aspect, the processing unit is further configured to determine a first target as the false alarm target, where a difference between an energy value of the first target on the first distance-velocity spectrum and an energy value of the first target on the second distance-velocity spectrum is greater than or equal to a first threshold.

With reference to the second aspect, in some implementations of the second aspect, the processing unit is further configured to perform synchronization on the first sounding signal and the sounding signal that is transmitted by the second radar in the first time period, so that a difference between a transmitting start time of the first sounding signal and a transmitting start time of the sounding signal that is transmitted by the second radar is less than or equal to a second threshold.

With reference to the second aspect, in some implementations of the second aspect, a guard period between the first sounding signal and the second sounding signal is greater than or equal to a third threshold.

With reference to the second aspect, in some implementations of the second aspect, duration of the first time period and duration of the second time period are the same or different.

According to a third aspect, a radar system is provided. The radar system includes a first radar and a second radar. The first radar is configured to: transmit a first sounding signal in a first time period of a first frame; transmit a second sounding signal in a second time period of the first frame; receive reflected signals, where the reflected signals include reflected signals corresponding to the first sounding signal and the second sounding signal, and receive reflected signals corresponding to sounding signals that are transmitted by the second radar in the first time period and the second time period; and determine a false alarm target based on a difference between a first distance-velocity spectrum and a second distance-velocity spectrum. The second sounding signal is a signal obtained through first phase code modulation based on the first sounding signal. The first distance-velocity spectrum is obtained based on a first reflected signal corresponding to the first sounding signal and a reflected signal corresponding to a sounding signal that is transmitted by the second radar in the first time period, and the second distance-velocity spectrum is obtained based on a second reflected signal corresponding to the second sounding signal and a reflected signal corresponding to a sounding signal that is transmitted by the second radar in the second time period.

With reference to the third aspect, in some implementations of the third aspect, the first time period is before the second time period in a time sequence, or the first time period is after the second time period in a time sequence.

With reference to the third aspect, in some implementations of the third aspect, the first time period and the second time period are shorter than or equal to a frame length of the first frame.

With reference to the third aspect, in some implementations of the third aspect, the first sounding signal is the same as the sounding signal transmitted by the second radar in the first time period. The second sounding signal is different from the sounding signal transmitted by the second radar in the second time period. The sounding signal transmitted by the second radar in the second time period is obtained by performing second phase code modulation on the sounding signal transmitted by the second radar in the first time period.

With reference to the third aspect, in some implementations of the third aspect, there are a plurality of second radars.

With reference to the third aspect, in some implementations of the third aspect, the second sounding signal and the sounding signal that is transmitted by the second radar in the second time period are mutually orthogonal or quasi-orthogonal phase code modulation signals.

With reference to the third aspect, in some implementations of the third aspect, before determining the false alarm target based on the difference between the first distance-velocity spectrum and the second distance-velocity spectrum, the first radar is further configured to: perform first-dimensional Fourier transform processing on the second reflected signal; perform, based on a code phase of the second sounding signal, phase code demodulation on the second reflected signal obtained through first-dimensional Fourier transform processing; and perform second-dimensional Fourier transform processing on the second reflected signal obtained through the phase code demodulation, to obtain the second distance-velocity spectrum With reference to the third aspect, in some implementations of the third aspect, if the first sounding signal is a signal on which phase code modulation is not performed, before determining the false alarm target based on the difference between the first distance-velocity spectrum and the second distance-velocity spectrum, the first radar is further configured to: perform first-dimensional Fourier transform processing on the first reflected signal; and perform second-dimensional Fourier transform processing on the first reflected signal obtained through first-dimensional Fourier transform processing, to obtain the first distance-velocity spectrum.

With reference to the third aspect, in some implementations of the third aspect, if the first sounding signal and the sounding signal that is transmitted by the second radar in the first time period are signals on which same phase code modulation is performed, before determining the false alarm target based on the difference between the first distance-velocity spectrum and the second distance-velocity spectrum, the first radar is further configured to: perform first-dimensional Fourier transform processing on the first reflected signal; perform, based on a code phase of the first sounding signal, the phase code demodulation on the first reflected signal obtained through first-dimensional Fourier transform processing; and perform second-dimensional Fourier transform processing on the first reflected signal obtained through the phase code demodulation, to obtain the first distance-velocity spectrum.

With reference to the third aspect, in some implementations of the third aspect, the first radar is further configured to determine a first target as the false alarm target. A difference between an energy value of the first target on the first distance-velocity spectrum and an energy value of the first target on the second distance-velocity spectrum is greater than or equal to a first threshold.

With reference to the third aspect, in some implementations of the third aspect, the first radar is further configured to perform synchronization on the first sounding signal and the sounding signal that is transmitted by the second radar in the first time period, so that a difference between a transmitting start time of the first sounding signal and a transmitting start time of the sounding signal that is transmitted by the second radar is less than or equal to a second threshold.

With reference to the third aspect, in some implementations of the third aspect, a guard period between the first sounding signal and the second sounding signal is greater than or equal to a third threshold.

With reference to the third aspect, in some implementations of the third aspect, duration of the first time period and duration of the second time period are the same or different According to a fourth aspect, a radar system is provided. The radar system includes a plurality of radars. A first radar of the plurality of radars includes at least one processor and a memory. The memory is configured to store a computer program, and the at least one processor is configured to invoke the computer program stored in the memory and run the computer program, to perform the method in the first aspect or the implementations of the first aspect.

According to a fifth aspect, a chip is provided. The chip includes at least one processor. The at least one processor is configured to invoke a computer program from a memory and run the computer program, so that a radar on which the chip is installed performs the method in the first aspect or the implementations of the first aspect.

According to a sixth aspect, a computer-readable storage medium is provided. The computer-readable storage medium is configured to store a computer program, where the computer program enables a computer to perform the method in the first aspect or the implementations of the first aspect.

According to a seventh aspect, a computer program product is provided. The computer program product includes computer program instructions, where the computer program instructions enable a computer to perform the method in the first aspect or the implementations of the first aspect.

According to an eighth aspect, a computer program is provided. The computer program enables a computer to perform the method in the first aspect or the implementations of the first aspect.

According to a ninth aspect, an intelligent device is provided. The intelligent device includes the apparatus in the second aspect or the implementations of the second aspect or includes the system in the third aspect or the implementations of the third aspect.

The intelligent device may be an unmanned aerial vehicle, a robot, a roadside unit, or the like.

According to a tenth aspect, a transportation tool is provided. The transportation tool includes the apparatus in the second aspect or the implementations of the second aspect or includes the system in the third aspect or the implementations of the third aspect.

The transportation tool may be a vehicle or the like.

DESCRIPTION OF EMBODIMENTS

The following describes technical solutions of this application with reference to accompanying drawings. It is clear that the described embodiments are some but not all of embodiments of this application. All other embodiments obtained by a person of ordinary skill in the art based on embodiments of this application without creative efforts shall fall within the protection scope of this application.

Figure 1:
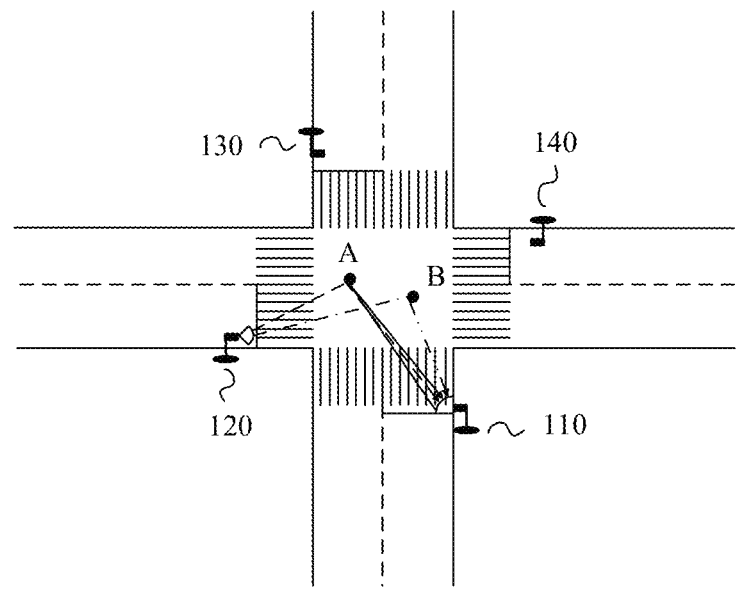
FIG. 1 is a schematic diagram of a working scenario of a multi-radar network according to an embodiment of this application.

FIG. 1 is a schematic diagram of a working scenario of a multi-radar network. To facilitate understanding of the solutions in embodiments of this application, the following first describes a working principle of the multi-radar network shown in FIG. 1. However, it should be understood that FIG. 1 merely shows an example of a location, a status, or the like of the multi-radar network, and the multi-radar network may alternatively be in another form. This should not constitute a special limitation on this application.

As shown in FIG. 1, it is assumed that the multi-radar network may include four radars, which are a radar 110, a radar 120, a radar 130, and a radar 140 located in four directions of a crossroad. A target A and a target B are located in the middle of the crossroad, and the target A and the target B may be moving vehicles, pedestrians, or the like. This is not specifically limited in this application.

The four radars may detect a target at the crossroad. For example, the radar 110 may transmit an electromagnetic wave, as shown by a black solid line in FIG. 1. After the electromagnetic wave transmitted by the radar 110 reaches the target A along a path shown by the black solid line, the electromagnetic wave is reflected by the target A along the path shown by the black solid line, and an echo of the electromagnetic wave enters a receiver of the radar 110. Information such as a distance, a speed, and an angle of the target A may be determined through subsequent processing.

However, in a process in which the radar 110 detects the target A, an echo that corresponds to an electromagnetic wave transmitted by the radar 120 to the target A and that is reflected by the target A may also be received, as shown by a dashed line in FIG. 1, and an echo that corresponds to an electromagnetic wave transmitted by the radar 140 to the target B and that is reflected by the target B may also be received, as shown by a double-dot line in FIG. 1.

Figure 2:
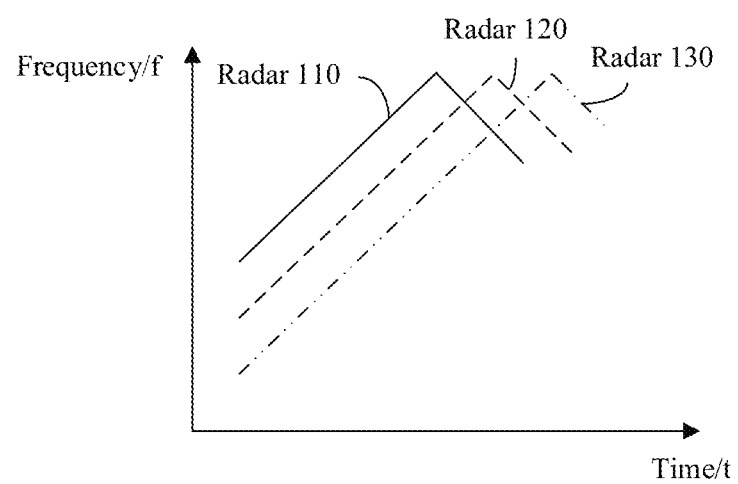
FIG. 2 is a schematic diagram of linear frequency modulation signals transmitted by a plurality of radars according to an embodiment of this application.

Transmission frequencies of the radar 110, the radar 120, and the radar 140 may be different. FIG. 2 is a schematic diagram of linear frequency modulation signals transmitted by the plurality of radars according to this embodiment of this application.

Figure 3:
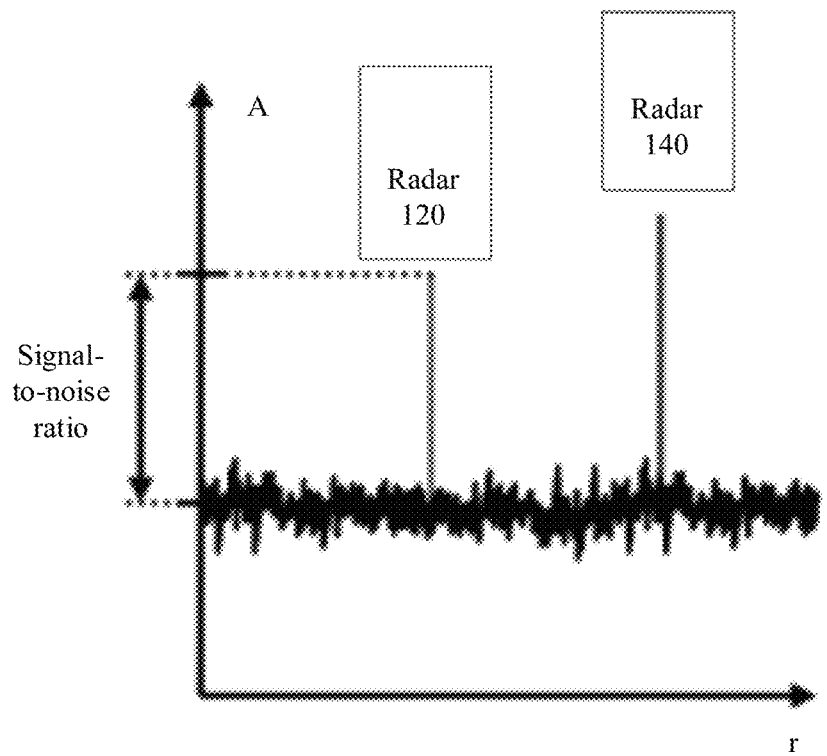
FIG. 3 is a schematic diagram of an interference signal according to an embodiment of this application.

After a reflected signal obtained after the electromagnetic wave transmitted by the radar 120 passes through the target A and a reflected signal obtained after the electromagnetic wave transmitted by the radar 140 passes through the target B arrive at the receiver of the radar 110, interference occurs after frequency mixing processing. FIG. 3 is a schematic diagram of an interference signal according to this embodiment of this application. Reflected signals from the target A and the target B enter the receiver of the radar 110 and form, after frequency mixing, a single-frequency signal. When the single-frequency signal falls outside a bandwidth range of the receiver of the radar 110, the single-frequency signal is filtered out. However, when the single-frequency signal falls within the bandwidth range of the receiver, a false alarm is generated, and misjudgment is caused.

To resolve such interference, currently, one method is to stagger working frequencies of the radars, so that the interference signal falls outside the bandwidth range of the receiver of the radar after frequency mixing. Because each radar works in a different frequency range, the interference signal can fall outside the bandwidth range of the receiver of the radar after frequency mixing processing. However, a working frequency range of the traffic radars at the crossroad is limited. For example, the traffic radars may work in the frequency range from 24 GHz to 24.25 GHz. A manner of staggering the frequencies between the radars and reducing a working bandwidth severely affects distance resolutions of the radars. For example, the four radars are deployed at the crossroad shown in FIG. 1. To avoid mutual interference, the four radars in FIG. 1 may separately work at frequencies of 24 GHz to 24.06 GHz, 24.06 GHz to 24.12 GHz, 24.12 GHz to 24.18 GHz, and 24.18 GHz to 24.25 GHz, and the working bandwidth of each radar is basically reduced to 60 MHz. As a result, a distance resolution is reduced by four times, and the distance resolution cannot meet an actual application requirement.

Figure 4:
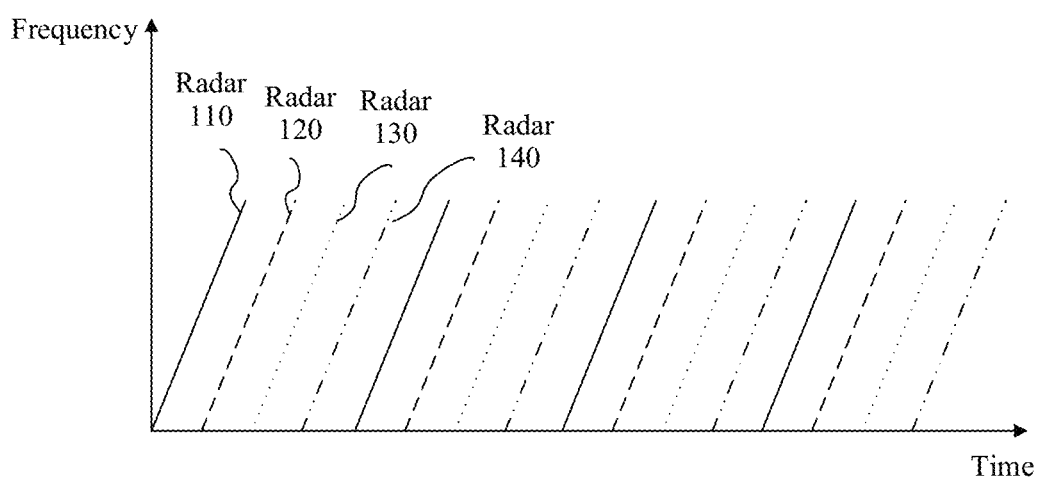
FIG. 4 is a schematic diagram of time synchronization according to an embodiment of this application.
Figure 5:
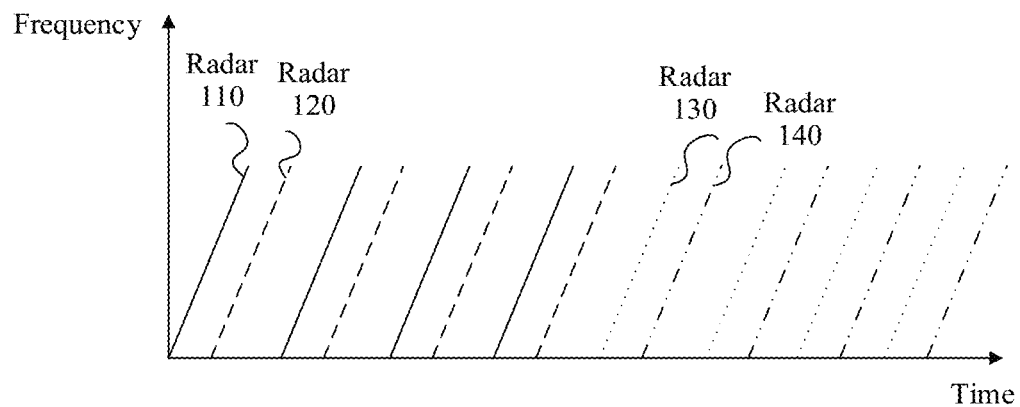
FIG. 5 is a schematic diagram of time synchronization according to another embodiment of this application.

Another method can solve interference based on time synchronization. FIG. 4 and FIG. 5 each are a schematic diagram of time synchronization. In FIG. 4, the four radars (the radar 110, the radar 120, the radar 130, and the radar 140) sequentially and alternately transmit signals in time. In FIG. 5, the radar 110 and the radar 120 alternately transmit signals in a first half-frame, and the radar 130 and the radar 140 alternately transmit signals in a second half-frame. Because the transmitted signals are staggered in time, an echo corresponding to another radar does not enter a receiver of a current working radar, or even if the echo corresponding to the another radar enters the receiver of the current working radar, a signal after frequency mixing falls outside the bandwidth range of the receiver. This can eliminate interference.

However, this solution has significant disadvantages. (1) When the plurality of radars perform time synchronization, that is, transmit the signals at different time in sequence, a fine-tuning time between the radars is greater than 2 µs to 3 µs; and this greatly wastes time resources, prolongs working periods of the radars, and is unacceptable in a scenario that has a high requirement on real-time performance. (2) The solution is not applicable to short pulses (10 µs to 20 µs), and an adjustable time range is limited.

Figure 6:
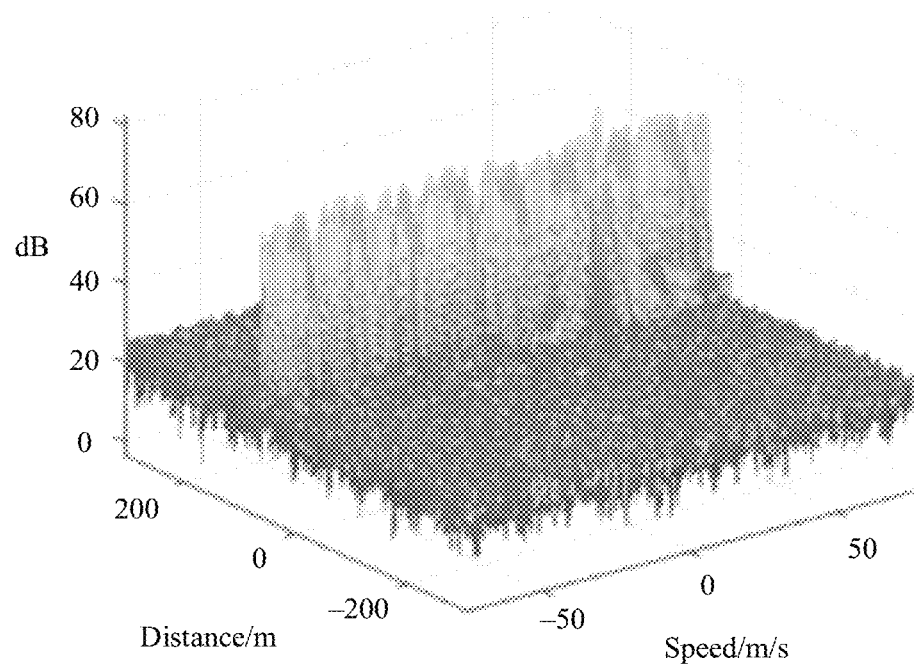
FIG. 6 is a schematic diagram of a simulation instance according to an embodiment of this application.

There is still another method to solve interference based on code division multiple access. In this solution, linear frequency modulation signal sequences are transmitted, and code division interference can be added between the sequences. Generally, an element sequence with good element orthogonality may be selected, for example, a Hadamard code or an M sequence. In a process of processing the echo signals, after each linear frequency modulation signal is de-sloped, fast Fourier transform (fast Fourier transform, FFT) processing can be performed first to obtain distance dimension information. Then, phase demodulation is performed by using code on a transmit side, and second-dimensional FFT processing is performed on a demodulated signal to obtain speed information of the target. In this process, if the target is a real target, each signal after demodulation does not include code phase information. However, if the target is an interference target, each signal after demodulation includes phase code information. Then, FFT processing can be performed to suppress the interference signal to some extent. FIG. 6 is a schematic diagram of a simulation instance according to this application. It can be learned that this solution suppresses the interference signal to some extent (about 10 dB), but cannot totally eliminate interference and the false alarm, and even increases low noise and raises a side lobe.

This application proposes a signal detection method, to determine a false alarm target. This can improve a probability and reliability of detecting a correct target, and implement a high distance resolution at no expense of bandwidth.

Figure 7:
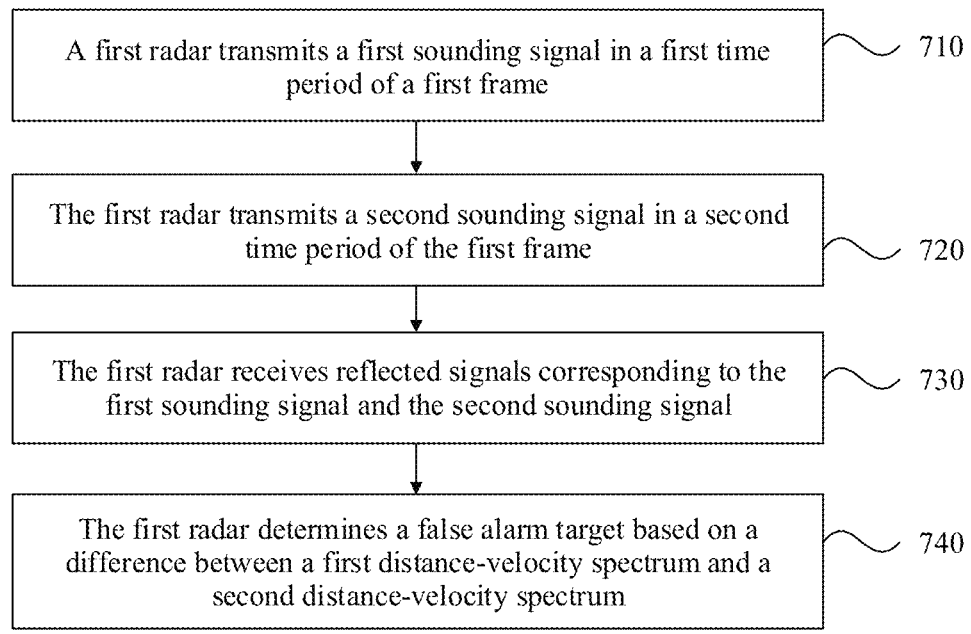
FIG. 7 is a schematic diagram of a signal detection method according to an embodiment of this application.

The following describes in detail a signal detection method 700 according to an embodiment of this application with reference to FIG. 7.

FIG. 7 shows the signal detection method 700 according to this embodiment of this application. The method 700 may include step 710 to step 740.

Step 710: A first radar transmits a first sounding signal in a first time period of a first frame.

The first frame in this embodiment of this application may include a plurality of sounding signals, for example, may include the first sounding signal and a second sounding signal.

Figure 8:
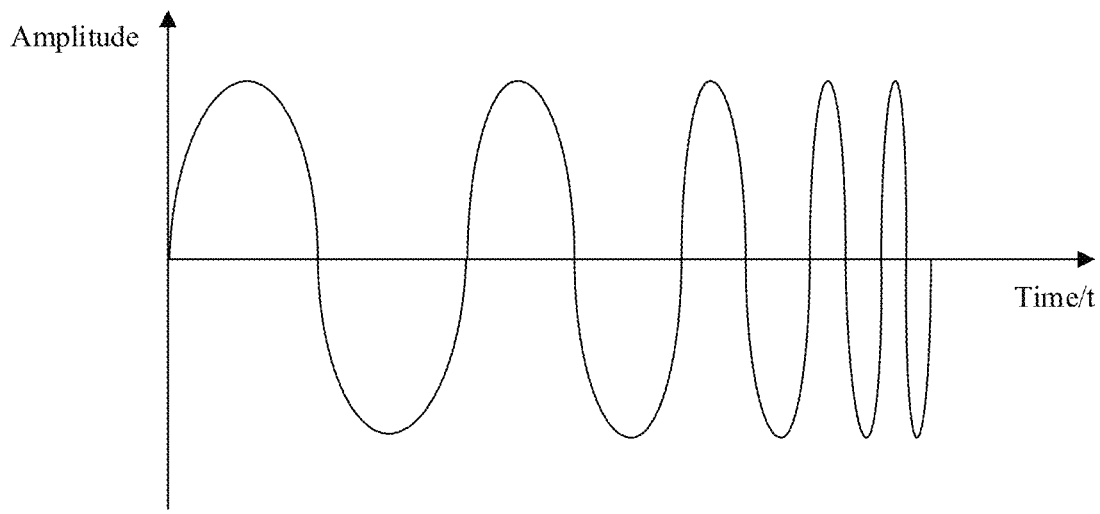
FIG. 8 is a schematic diagram of a linear frequency modulation signal sequence according to an embodiment of this application.

The first sounding signal in this embodiment of this application may include a plurality of linear frequency modulation signals. A characteristic of a sequence of the signals is that frequencies of the signals continuously increase as time goes by, that is, a period becomes shorter. FIG. 8 is a schematic diagram of a linear frequency modulation signal sequence according to this embodiment of this application. It can be seen from the figure that as time increases, a period of signals becomes shorter.

Specifically, it can be learned from FIG. 8 that duration of a time period 0–T1 is greater than duration of a time period T1-T2, and the duration of the time period T1-T2 is greater than duration of a time period T2-T3. In other words, as time increases, a period of signals becomes shorter.

Figure 9:
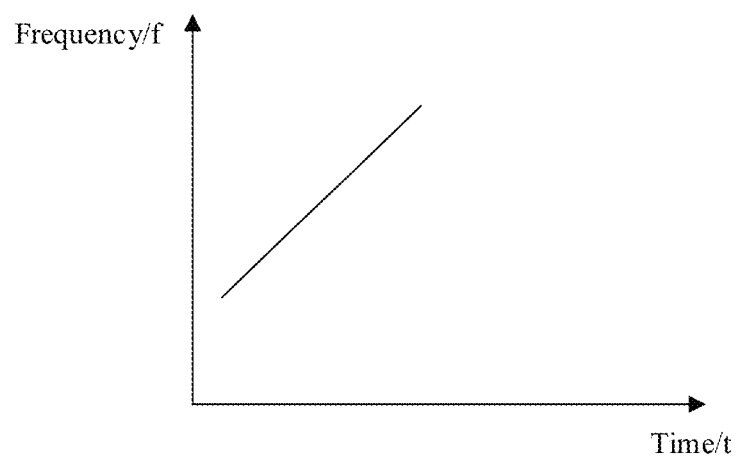
FIG. 9 is a schematic diagram of a linear frequency modulation signal according to another embodiment of this application.

FIG. 9 is a schematic diagram of a linear frequency modulation signal according to this embodiment of this application. A horizontal coordinate represents a time, and a vertical coordinate represents a frequency. It can be clearly seen from the figure that, as the time increases, the frequency linearly increases.

Step 720: The first radar transmits a second sounding signal in a second time period of the first frame.

The first sounding signal and the second sounding signal in this embodiment of this application each may include a plurality of linear frequency modulation signals. For example, as shown in (a) in FIG. 10, a plurality of (L shown in the figure) linear frequency modulation signals transmitted within time T1 shown in the figure may indicate the first sounding signal in this embodiment of this application, and a plurality of (M shown in the figure) linear frequency modulation signals transmitted within time T2 shown in the figure may indicate the second sounding signal in this embodiment of this application.

L and M in this embodiment of this application may be the same or may be different. This is not limited.

For example, assuming that the first frame includes 128 linear frequency modulation signals, both L and M may be 64, or L and M may be 32 and 96. When both L and M are 64, that is, 64 linear frequency modulation signals are transmitted within the time T1, and 64 linear frequency modulation signals are also transmitted within the time T2. When L and M are 32 and 96 respectively, that is, 32 linear frequency modulation signals are transmitted within the time T1, and 96 linear frequency modulation signals are transmitted within the time T2.

It should be understood that the foregoing value is merely an example for description, may alternatively be another value, and should not be construed as a particular limitation on this application.

Step 730: The first radar receives reflected signals corresponding to the first sounding signal and the second sounding signal.

In this embodiment of this application, after the first radar transmits the first sounding signal, a reflected signal may be formed after the first sounding signal passes through a target object. The reflected signal may be received by the first radar along a path. The first radar may determine information such as a distance, a speed, or an angle of the target object through processing on the reflected signal.

It should be noted that, in some embodiments, the first radar may belong to a multi-radar network. In a working scenario of the multi-radar network, the reflected signals in this embodiment of this application may include a plurality of reflected signals, for example, may include the foregoing reflected signal corresponding to the first radar reflected by the target object, a reflected signal corresponding to the first radar reflected by another object, a reflected signal corresponding to another radar in the plurality of radars reflected by the target object, and a reflected signal corresponding to the another radar in the plurality of radars reflected by the another object.

In addition, the first radar may further receive a signal transmitted by another radar. As a result, the reflected signals further include the signal transmitted by the another radar.

Because the reflected signals include a large quantity of signals, when the first radar determines the information of the target object, interference from another received signal occurs. Therefore, the first radar may process the received reflected signals. For details, refer to the following description.

Step 740: The first radar determines a false alarm target based on a difference between a first distance-velocity spectrum and a second distance-velocity spectrum.

The second sounding signal is a signal obtained through first phase code modulation based on the first sounding signal. The first distance-velocity spectrum is obtained based on a first reflected signal corresponding to the first sounding signal, and the second distance-velocity spectrum is obtained based on a second reflected signal corresponding to the second sounding signal.

In this embodiment of this application, after receiving the reflected signals corresponding to the first sounding signal and the second sounding signal, the first radar may separately process the first reflected signal and the second reflected signal to obtain the corresponding first distance-velocity spectrum and the corresponding second distance-velocity spectrum, and determine the false alarm target based on an energy difference between the two spectra and remove the false alarm target, and identify a real target.

In this embodiment of this application, the first radar may perform the first phase code modulation on the first sounding signal to obtain the second sounding signal. It should be noted that, in this embodiment of this application, performing the first phase code modulation on the first sounding signal to obtain the second sounding signal may refer to adding an element sequence to the first sounding signal to obtain the second sounding signal. For example, a Hadamard code or M sequence may be added.

According to the solution provided in this embodiment of this application, the first radar processes the received reflected signals, and compares processing results, to determine the false alarm target, remove the false alarm target, and identify the real target. This can improve a probability and reliability of detecting the correct target, and implement a high distance resolution at no expense of bandwidth.

Optionally, in some embodiments, the first time period is before the second time period in a time sequence, or the first time period is after the second time period in a time sequence.

In this embodiment of this application, the first time period and the second time period may be different in the time sequence. In other words, the first time period may be before the second time period, or the first time period may be after the second time period. This is not limited.

Optionally, in some embodiments, the first time period and the second time period are shorter than or equal to a frame length of the first frame.

Figure 10:
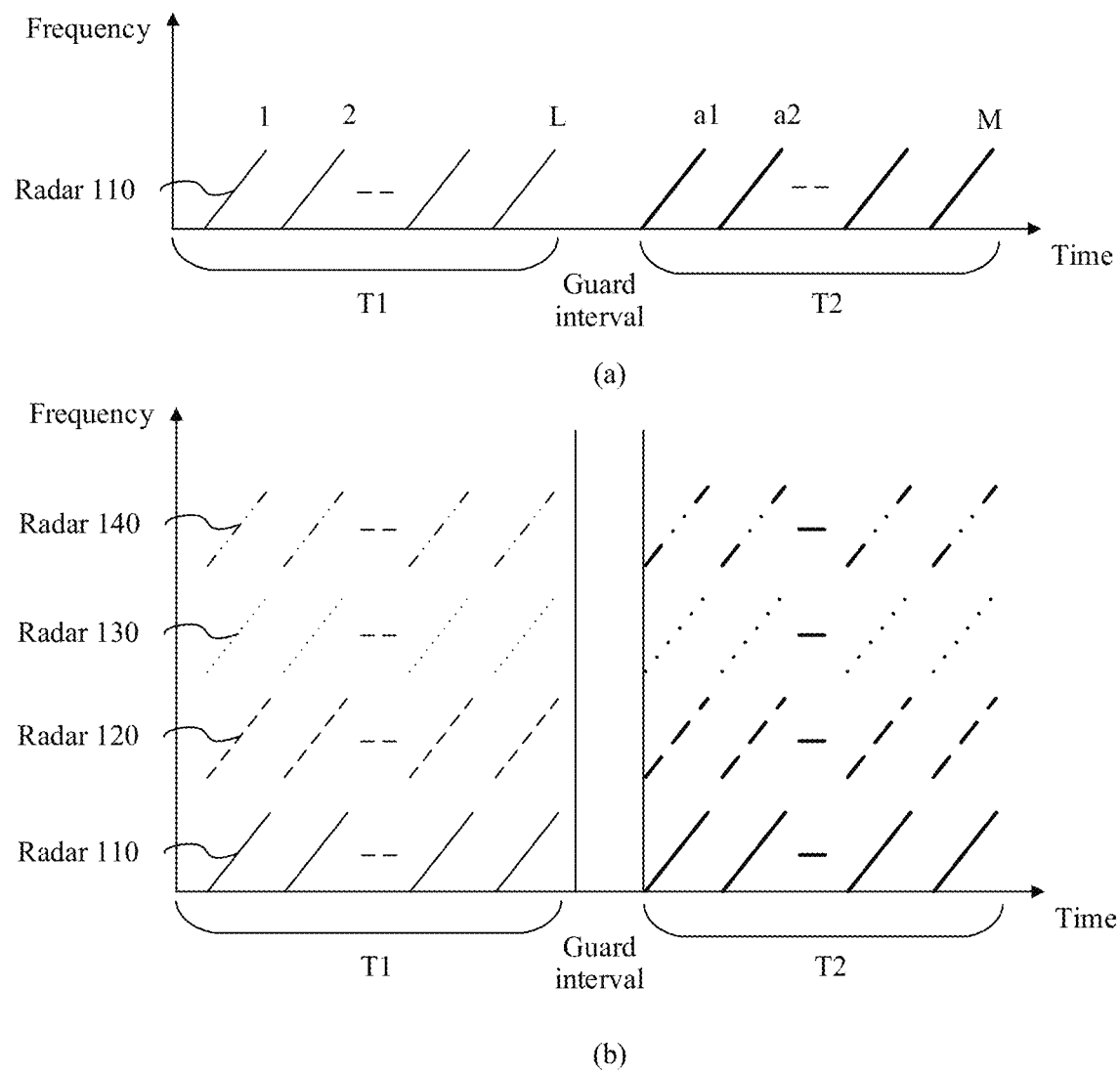
FIG. 10 is a schematic diagram of distribution of a time-frequency waveform transmitted by a radar according to an embodiment of this application.

In this embodiment of this application, the first frame may include a plurality of linear frequency modulation signals. It is assumed that both L and M in (a) in FIG. 10 are 64, that is, the first sounding signal includes 64 linear frequency modulation signals, and the second sounding signal also includes 64 linear frequency modulation signals obtained through the first phase code modulation. In this case, the first frame includes 128 linear frequency modulation signals.

It should be noted that the first time period and the second time period may be equal to the frame length of the first frame, or may be shorter than the frame length of the first frame. As described above, assuming that duration of the first frame is T1+T2, duration of the first time period may be equal to T1, and duration of the second time period may be equal to T2; or duration of the first time period may be shorter than T1, and duration of the second time period may be shorter than T2. This is not specifically limited in this application.

Figure 11:
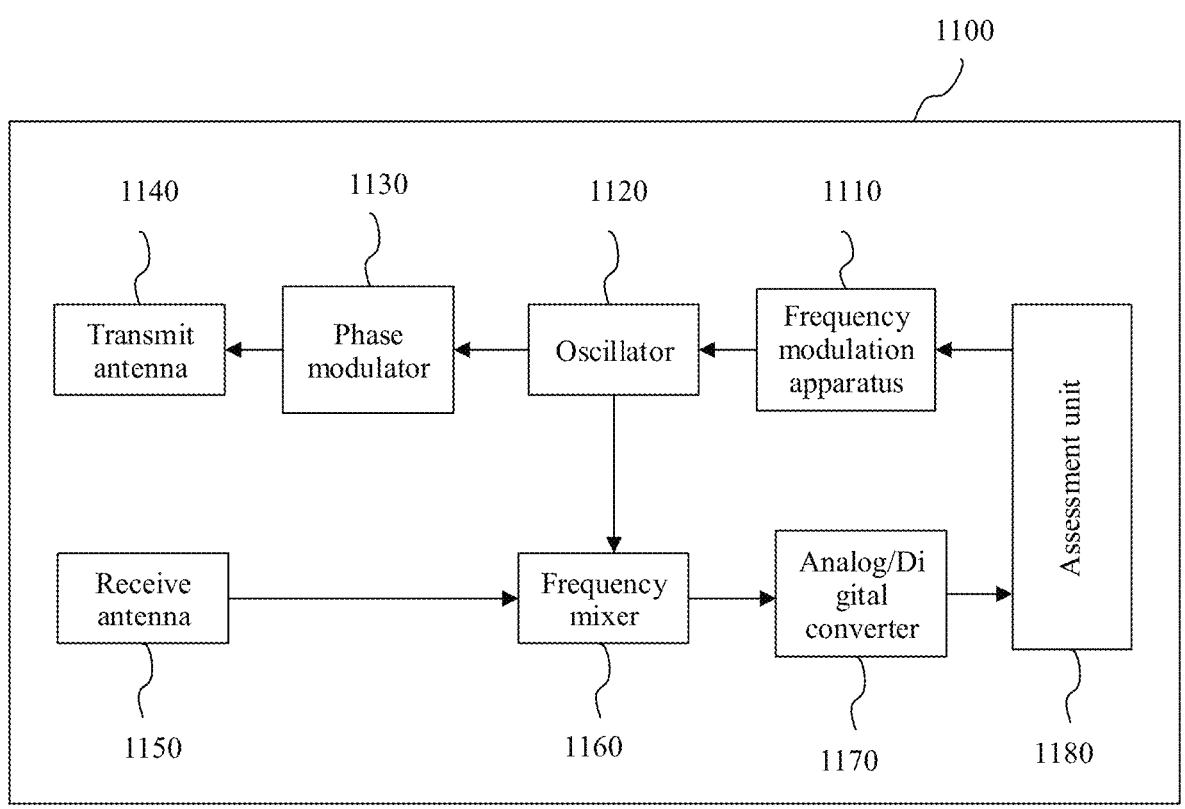
FIG. 11 is a schematic diagram of a working principle of a radar according to an embodiment of this application.

To help understand the solutions of this application more clearly, the following first describes a working principle of a radar with reference to FIG. 11. FIG. 11 is a schematic diagram 1100 of a working principle of a radar according to an embodiment of this application. A frequency modulation apparatus 1110, an oscillator 1120, a phase modulator 1130, a transmit antenna 1140, a receive antenna 1150, a frequency mixer 1160, an analog/digital converter 1170, and an assessment unit 1180 may be included in the figure.

The oscillator 1120 may generate a sounding signal. The frequency modulation apparatus 1110 may adjust the sounding signal generated by the oscillator 1120, for example, may adjust a signal with a frequency f1 to a signal with a frequency f2, to obtain a required frequency signal. In some embodiments, the phase modulator 1130 may perform phase adjustment on the sounding signal modulated by the frequency modulation apparatus 1110. The signal modulated by the phase modulator 1130 is transmitted by the transmit antenna 1140, and after the signal is reflected by a target object, a reflected wave of the signal may be received by the receive antenna 1150. The frequency mixer 1160 may perform frequency mixing on the received signal received by the receive antenna 1150 and the signal that is transmitted by the oscillator 1120 and that is modulated by the frequency modulation apparatus 1110, to generate an intermediate frequency signal. The analog/digital converter 1170 may perform sampling and digitization processing on the intermediate frequency signal, and the assessment unit 1180 may evaluate and predict a processed signal.

It is noted above that the first radar receives the reflected signals corresponding to the first sounding signal and the second sounding signal, and the reflected signals may include a sounding signal transmitted by a second radar and a signal obtained after the sounding signal is reflected by an object. In this case, sounding signals transmitted by the first radar and the second radar in different time periods may be the same or different. This is described in detail below.

Optionally, in some embodiments, the first sounding signal is the same as a sounding signal transmitted by the second radar in the first time period. The second sounding signal is different from a sounding signal transmitted by the second radar in the second time period. The sounding signal transmitted by the second radar in the second time period is obtained by performing second phase code modulation on the sounding signal transmitted by the second radar in the first time period.

Optionally, in some embodiments, there are a plurality of second radars.

In this embodiment of this application, the second radar may perform the second phase code modulation on the sounding signal transmitted in the first time period, to obtain the sounding signal transmitted in the second time period. It should be noted that, in this embodiment of this application, performing the second phase code modulation on the sounding signal transmitted in the first time period to obtain the sounding signal transmitted in the second time period may refer to adding an element sequence to the sounding signal transmitted in the first time period to obtain the sounding signal transmitted in the second time period. For example, a Hadamard code or M sequence may be added.

For example, (b) in FIG. 10 is a schematic diagram of distribution of time-frequency waveforms transmitted by a plurality of radars. Assuming that there are four radars (the radar 110, the radar 120, the radar 130, and the radar 140). The radar 110 is the first radar in this application, and the radar 120 to the radar 140 are the second radars in this application. In addition, a sounding signal transmitted by each of the four radars within the time T1 (which may be understood as the first time period in this application) is the same, and a sounding signal transmitted by each of the four radars within the time T2 (which may be understood as the second time period in this application) is different from each other.

In addition, in this embodiment of this application, the sounding signal transmitted by each of the four radars within the time T2 is obtained by performing phase code modulation on the sounding signal transmitted within the time T1.

Specifically, the second sounding signal transmitted by the radar 110 is obtained by performing the first phase code modulation on the first sounding signal transmitted by the radar 110 within the time T1. The sounding signal transmitted by the radar 120 within the time T2 is obtained by performing the second phase code modulation on the sounding signal transmitted by the radar 120 within the time T1. Similarly, the sounding signal transmitted by the radar 130 within the time T2 is obtained by performing the second phase code modulation on the sounding signal transmitted by the radar 130 within the time T1. The sounding signal transmitted by the radar 140 within the time T2 is obtained by performing the second phase code modulation on the sounding signal transmitted by the radar 140 within the time T1.

Optionally, in some embodiments, the method further includes: The first radar receives reflected signals corresponding to sounding signals transmitted by the second radar in the first time period and the second time period.

In this embodiment of this application, as described above, when receiving corresponding reflected signals of the first sounding signal and the second sounding signal, the first radar may also receive reflected signals of sounding signals that are transmitted by the second radar in the first time period and the second time period.

It should be noted that, the first radar may not know which signals are included in the received reflected signals. As a result, a determined target is the false alarm target. Therefore, the first radar needs to process the received reflected signals, determine the false alarm target based on a processing result, remove the false alarm target, sand identify the correct target.

It is noted above that, in addition to receiving the reflected signals corresponding to the sounding signals transmitted by the first radar, the first radar may receive the sounding signal transmitted by the second radar and the reflected signal corresponding to the sounding signal transmitted by the second radar. Based on this, distance-velocity spectra obtained after the first radar processes the received reflected signals may be different.

Optionally, in some embodiments, the first distance-velocity spectrum is obtained based on the first reflected signal corresponding to the first sounding signal and a reflected signal corresponding to a sounding signal transmitted by at least one second radar in the first time period. The second distance-velocity spectrum is obtained based on the second reflected signal corresponding to the second sounding signal and a reflected signal corresponding to a sounding signal transmitted by the at least one second radar in the second time period.

In this embodiment of this application, if the first radar further receives, in a process of receiving the reflected signals corresponding to the first sounding signal and the second sounding signal, the reflected signal of the sounding signal transmitted by the second radar, the first radar may determine the first distance-velocity spectrum based on the reflected signal corresponding to the first sounding signal and the reflected signal corresponding to the sounding signal transmitted by the second radar in the first time period. Similarly, the first radar may determine the second distance-velocity spectrum based on the reflected signal corresponding to the second sounding signal and the reflected signal corresponding to the sounding signal transmitted by the second radar in the second time period.

As described above, the second sounding signal transmitted by the first radar is obtained through the first phase code modulation based on the first sounding signal, and the sounding signal transmitted by the second radar in the second time period is obtained by performing the second phase code modulation on the sounding signal transmitted by the second radar in the first time period. The second sounding signal transmitted by the first radar in the second time period and the sounding signal transmitted by the second radar in the second time period may meet a specific relationship. For details, refer to the following description.

Optionally, in some embodiments, the second sounding signal and the sounding signal that is transmitted by the second radar in the second time period are mutually orthogonal or quasi-orthogonal phase code modulation signals.

In this embodiment of this application, the second sounding signal transmitted by the first radar in the second time period and the sounding signal transmitted by the second radar in the second time period may be pairwise orthogonal or quasi-orthogonal. As shown in (b) in FIG. 10, the second sounding signal transmitted by the radar 110 is orthogonal or quasi-orthogonal to sounding signals transmitted by the radar 120, the radar 130, and the radar 140 in the second time period; the sounding signal transmitted by the radar 120 in the second time period is orthogonal or quasi-orthogonal to sounding signals transmitted by the radar 130 and the radar 140 in the second time period; and the sounding signal transmitted by the radar 130 in the second time period is orthogonal or quasi-orthogonal to the sounding signal transmitted by the radar 140 in the second time period.

It is noted above that the second sounding signal is obtained through the first phase code modulation based on the first sounding signal, and the sounding signal transmitted by the second radar in the second time period is obtained through the second phase code modulation based on the sounding signal transmitted by the second radar in the first time period. However, phase code modulation in this embodiment of this application may be understood as adding an element sequence to the first sounding signal or the sounding signal transmitted by the second radar in the first time period.

Therefore, in an embodiment, that the second sounding signal and the sounding signal transmitted by the second radar in the second time period are mutually orthogonal or quasi-orthogonal phase code modulation signals may be understood as that element sequences added to sounding signals transmitted by the first radar and the second radar in the first time period are mutually orthogonal or quasi-orthogonal.

Specifically, as shown in (b) in FIG. 10, an element sequence added by the radar 110 is orthogonal or quasi-orthogonal to element sequences added by the radar 120, the radar 130, and the radar 140; an element sequence added by the radar 120 is orthogonal or quasi-orthogonal to element sequences added by the radar 130 and the radar 140; and an element sequence added by the radar 130 is orthogonal or quasi-orthogonal to an element sequence added by the radar 140.

It may be understood that, for sounding signals transmitted in the second time period, because element sequences added to signals transmitted by the radars in the second time period are pairwise orthogonal, the sounding signals transmitted by the radars in the second time period are pairwise orthogonal. Therefore, each radar may be related to a reflected signal, reflected by the target, corresponding to a transmit signal transmitted by the radar, but may be irrelevant to or weakly related to a reflected signal, reflected by the target, corresponding to a transmit signal transmitted by another radar.

Specifically, the radar 110 is used as an example for description. The radar 110 transmits the second sounding signal in the second time period. After the second sounding signal is reflected by the target, a reflected signal of the second sounding signal enters the radar 110. The radar 110 may obtain the target information after performing related processing on the received signal. However, if a reflected signal that is of a signal transmitted by another radar and that is reflected by the object enters the first radar, for example, a reflected signal that is of the sounding signal transmitted by the radar 120 and that is reflected by the target object enters the radar 110, because the sounding signal transmitted by the radar 120 in the second time period is orthogonal to the second sounding signal transmitted by the radar 110 in the second time period, the radar 110 cannot obtain the target information after performing related processing on the received reflected signal that is of the sounding signal transmitted by the radar 120 and that is reflected by the target object.

For the first sounding signal transmitted by the radar 110 in the first time period, the reflected signal that is of the first sounding signal transmitted by the radar 110 in the first time period and that is reflected by the target object, enters the radar 110. After performing related processing on the received signal, the radar 110 may obtain the target information. If the reflected signal that is of the signal transmitted by the another radar and that is reflected by the object enters the radar 110, for example, a reflected signal that is of the signal transmitted by the radar 120 and that is reflected by the target object enters the radar 110, because the sounding signal transmitted by the radar 120 in the first time period is the same as the first sounding signal transmitted by the radar 110 in the first time period, the radar 110 may also obtain the target information after performing related processing on the received reflected signal that is of the signal transmitted by the radar 120 and that is reflected by the target object.

Based on the foregoing process, the radar 110 processes the received reflected signals for comparison. If target energy corresponding to the first reflected signal is consistent with that corresponding to the second reflected signal, the target is the real target. If target energy corresponding to the first reflected signal is inconsistent with that corresponding to the second reflected signal, for example, an energy difference between the target energy corresponding to the first reflected signal and the target energy corresponding to the second reflected signal is greater than a first threshold, the target may be considered as the false alarm target.

According to the solution provided in this embodiment of this application, because sounding signals transmitted by different radars in the second time period are mutually orthogonal or quasi-orthogonal phase code modulation signals, this can effectively resolve interference in the multi-radar network, determine a false alarm target, and further improve a probability and reliability of detecting the correct target.

As mentioned above, after receiving the reflected signals, the first radar may determine the false alarm target based on the difference between the first distance-velocity spectrum and the second distance-velocity spectrum. Obtaining of the first distance-velocity spectrum and the second distance-velocity spectrum is separately described in detail below.

Figure 12:
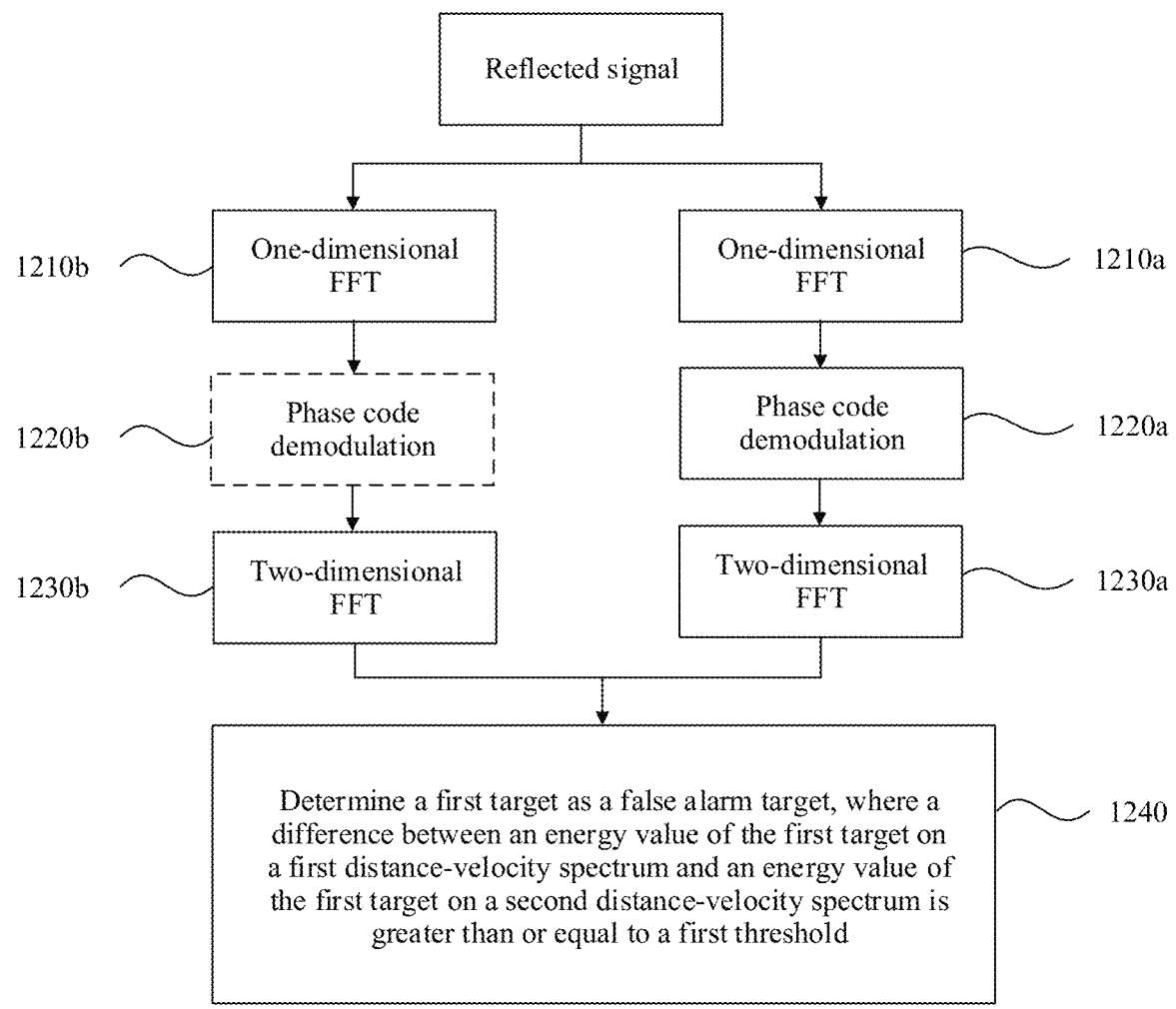
FIG. 12 is a schematic diagram of a signal detection method according to an embodiment of this application.

Optionally, in some embodiments, as shown in FIG. 12, before the first radar determines the false alarm target based on the first distance-speed spectrum and the second distance-speed spectrum, the method may further include steps 1210*a* to 1230*a*.

Step 1210*a*: The first radar performs first-dimensional Fourier transform processing on the second reflected signal.

Step 1220*a*: The first radar performs, based on a code phase of the second sounding signal, phase code demodulation on the second reflected signal obtained through first-dimensional Fourier transform processing.

Step 1230*a*: The first radar performs second-dimensional Fourier transform processing on the second reflected signal obtained through the phase code demodulation, to obtain the second distance-velocity spectrum.

In this embodiment of this application, because the second sounding signal transmitted by the first radar is a signal obtained through the first phase code modulation based on the first sounding signal, after receiving the reflected signals and performing first-dimensional FFT processing on the second reflected signal included in the reflected signals, the first radar may perform, based on the code phase of the second sounding signal, the phase code demodulation on the second reflected signal obtained through first-dimensional FFT processing, and then perform second-dimensional FFT processing on the second reflected signal obtained through the phase code demodulation, to obtain the second distance-velocity spectrum in this embodiment of this application.

It may be understood that, it is assumed that when phase code modulation is performed on the first sounding signal, an element sequence is added to obtain the second sounding signal. Subsequently, when the first radar demodulates the received second reflected signal, because the second sounding signal may be related to the second reflected signal, target information may be obtained.

It should be noted that, as described above, if the first radar further receives the reflected signal corresponding to the sounding signal transmitted by the at least one second radar in the second time period, the second distance-velocity spectrum may be obtained based on the second reflected signal corresponding to the second sounding signal and the reflected signal corresponding to the sounding signal transmitted by the at least one second radar in the second time period.

Specifically, step 1210*a* may be replaced with "the first radar performs first-dimensional Fourier transform processing on the second reflected signal and the reflected signal corresponding to the sounding signal transmitted by the at least one second radar in the second time period".

Step 1220*a* may be replaced with "the first radar performs, based on a code phase of the second sounding signal, phase code demodulation on the second reflected signal and the reflected signal corresponding to the sounding signal transmitted by the at least one second radar in the second time period which are obtained through first-dimensional Fourier transform processing".

Step 1230*a* may be replaced with "the first radar performs second-dimensional Fourier transform processing on the second reflected signal and the reflected signal corresponding to the sounding signal transmitted by the at least one second radar in the second time period that are obtained through the phase code demodulation, to obtain the second distance-velocity spectrum".

Optionally, in some embodiments, as shown in FIG. 12, if the first sounding signal is a signal on which phase code modulation is not performed, before the first radar determines the false alarm target based on the difference between the first distance-velocity spectrum and the second distance-velocity spectrum, the method may further include steps 1210*b* and 1230*b*.

Step 1210*b*: The first radar performs first-dimensional Fourier transform processing on the first reflected signal.

Step 1230*b*: The first radar performs second-dimensional Fourier transform processing on the first reflected signal obtained through first-dimensional Fourier transform processing, to obtain the first distance-velocity spectrum.

In this embodiment of this application, because the first sounding signal transmitted by the first radar is a signal on which code modulation is not performed, after receiving the reflected signals, the first radar performs first-dimensional FFT processing on the first reflected signal, and then performs second-dimensional FFT processing on the first reflected signal, to obtain the first distance-velocity spectrum in this embodiment of this application.

Similarly, if the first radar further receives a reflected signal corresponding to a sounding signal transmitted by the at least one second radar in the first time period, the first distance-velocity spectrum may be obtained based on the first reflected signal corresponding to the first sounding signal and the reflected signal corresponding to the sounding signal transmitted by the at least one second radar in the first time period.

Specifically, step 1210*b* may be replaced with "the first radar may perform first-dimensional Fourier transform processing on the first reflected signal and the reflected signal corresponding to the sounding signal transmitted by the at least one second radar in the first time period".

Step 1230*b* may be replaced with "the first radar performs second-dimensional Fourier transform processing on the first reflected signal and the reflected signal corresponding to the sounding signal transmitted by the at least one second radar in the first time period that are obtained through first-dimensional Fourier transform processing, to obtain the first distance-velocity spectrum".

In some embodiments, same phase code modulation may be performed on the first sounding signal transmitted by the first radar and the sounding signal transmitted by the second radar in the first time period. In this case, second-dimensional FFT transform processing may be performed on the received reflected signals after the phase code demodulation is performed on the received reflected signals. For details, refer to the following description.

Optionally, in some embodiments, if the first sounding signal and the sounding signal that is transmitted by the second radar in the first time period are signals on which same phase code modulation is performed, before the first radar determines the false alarm target based on the difference between the first distance-velocity spectrum and the second distance-velocity spectrum, the method may further include steps 1210*b* to 1230*b*.

Step 1210*b*: The first radar performs first-dimensional Fourier transform processing on the first reflected signal.

Step 1220*b*: The first radar performs, based on a code phase of the first sounding signal, the phase code demodulation on the first reflected signal obtained through first-dimensional Fourier transform processing.

Step 1230*b*: The first radar performs second-dimensional Fourier transform processing on the first reflected signal obtained through the phase code demodulation, to obtain the first distance-velocity spectrum.

In this embodiment of this application, because the first sounding signal transmitted by the first radar is a signal on which code modulation is performed, after receiving the reflected signals, the first radar may perform first-dimensional FFT processing on the first reflected signal, perform, based on the code phase of the first sounding signal, the phase code demodulation on the first reflected signal obtained through first-dimensional FFT processing, and finally perform second-dimensional FFT processing on the first reflected signal, to obtain the first distance-velocity spectrum in this embodiment of this application.

It may be understood that, because the phase code modulation is performed on the first sounding signal transmitted by the first radar, when the received first reflected signal is subsequently processed, the phase code demodulation may also be performed on the first reflected signal obtained through first-dimensional FFT processing, and then second-dimensional FFT processing is performed on a demodulated signal, so as to obtain the first distance-velocity spectrum.

It may be further understood that although the phase code modulation is performed on the first sounding signal transmitted by the first radar, because the same phase code modulation is performed on the sounding signal transmitted by the second radar in the first time period as that performed on the first sounding signal transmitted by the first radar in the first time period, even if the reflected signals received by the first radar include a reflected signal corresponding to the second radar reflected by the object, the target information (the target may be the false alarm target) may be obtained when related processing is performed on the reflected signals.

Similarly, if the first radar further receives the reflected signal corresponding to the sounding signal transmitted by the at least one second radar in the first time period, the first distance-velocity spectrum may be obtained based on the first reflected signal corresponding to the first sounding signal and the reflected signal corresponding to the sounding signal transmitted by the at least one second radar in the first time period.

For specific steps, refer to the foregoing steps 1210*b* to 1230*b*. A difference lies in different to-be-processed signals. For brevity, details are not described herein again.

Optionally, in some embodiments, as shown in FIG. 12, that the first radar determines the false alarm target based on the difference between the first distance-velocity spectrum and the second distance-velocity spectrum may include step 1240.

Step 1240: The first radar determines a first target as the false alarm target, where a difference between an energy value of the first target on the first distance-velocity spectrum and an energy value of the first target on the second distance-velocity spectrum is greater than or equal to a first threshold.

The first threshold in this embodiment of this application may be set based on factory settings, or may be adjusted based on a requirement. This is not limited.

In this embodiment of this application, after the first distance-velocity spectrum and the second distance-velocity spectrum are obtained, the false alarm target may be determined based on the energy difference of the two distance-velocity spectra, the false alarm target is removed, and the real target is identified.

Figure 13:
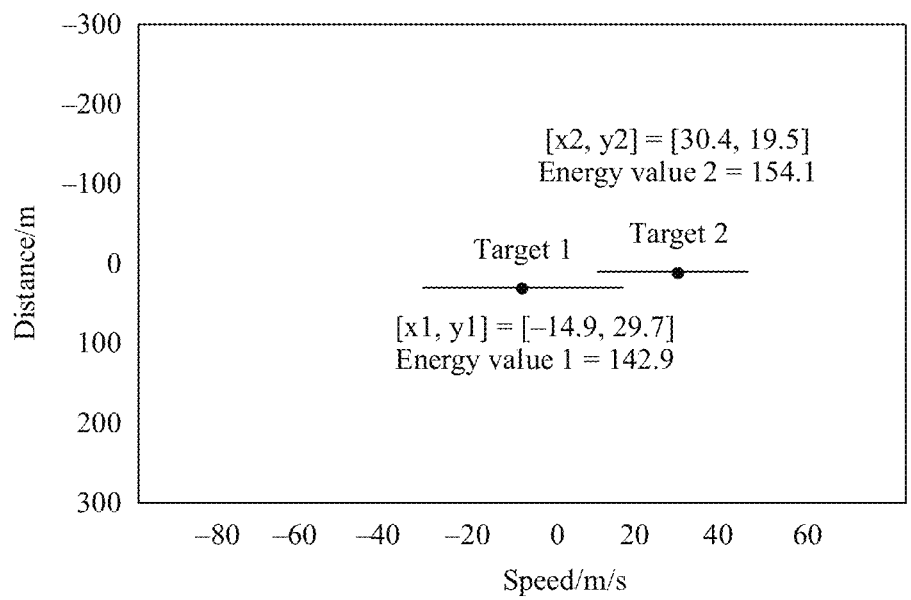
FIG. 13 is a schematic diagram of a simulation instance of a first half-frame sounding signal according to an embodiment of this application.

For example, as shown in FIG. 13, it can be seen from FIG. 13 that after performing related processing on the received first reflected signal, the first radar may detect two targets: a target 1 and a target 2. Coordinate information of a speed and a distance of the target 1 on the first distance-velocity spectrum is [x1, y1]=(−14.9, 29.7), and an energy value 1 corresponding to the target 1 may be 142.9. Coordinate information of a speed and a distance of the target 2 on the first distance-velocity spectrum is [x2, y2]=(30.4, 19.5), and an energy value 2 corresponding to the target 2 may be 154.1. In other words, based on a result obtained by processing the first reflected signal, there is an object whose speed is −14.9 m/s at a location 29.7 meters away from the first radar, and an energy value corresponding to the object is 142.9; and there is an object whose speed is 30.4 m/s at a location 19.5 meters away from the first radar, and an energy corresponding to the object is 154.1.

Figure 14:
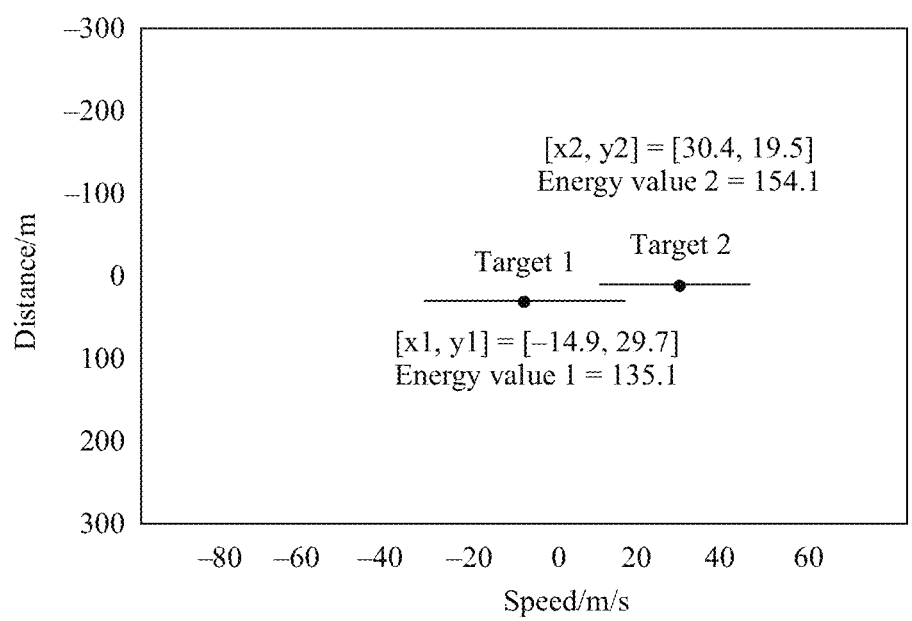
FIG. 14 is a schematic diagram of a simulation instance of a second half-frame sounding signal according to an embodiment of this application.

It can be seen from FIG. 14 that, after performing related processing on the received second reflected signal, the first radar may also detect two targets: the target 1 and the target 2. Coordinate information of a speed and a distance of the target 1 on the second distance-velocity spectrum is [x1, y1]=(−14.9, 29.7), and an energy value 1 corresponding to the target 1 may be 135.1. Coordinate information of a speed and a distance of the target 2 on the second distance-velocity spectrum is [x2, y2]=(30.4, 19.5), and an energy value 2 corresponding to the target 2 may be 154.1. In other words, based on a result obtained by processing the second reflected signal, there is an object whose speed is −14.9 m/s at a location 29.7 meters away from the first radar, and an energy value corresponding to the object is 135.1; and there is an object whose speed is 30.4 m/s at a location 19.5 meters away from the first radar, and an energy corresponding to the object is 154.1.

Figure 15:
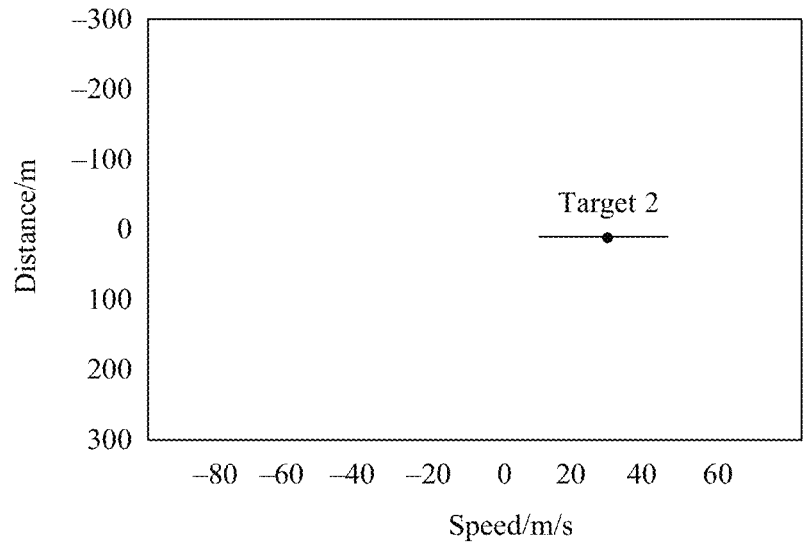
FIG. 15 is a schematic diagram of a simulation instance of removing a false alarm target according to an embodiment of this application.

FIG. 13 is compared with FIG. 14. It can be seen that there is a difference between energy values of the target 1, and there is no difference between energy values of the target 2. If the first threshold in this embodiment of this application is set to 2, the target 1 is the false alarm target, and the target 2 is the real target. Therefore, the target 1 may be removed, and the target 2 is retained, as shown in FIG. 15.

It should be understood that the foregoing value is merely an example for description, may alternatively be another value, and should not be construed as a particular limitation on this application.

According to the solution provided in this embodiment of this application, based on the energy difference between the distance-velocity spectra of the first reflected signal and the second reflected signal, this can resolve interference between the multi-radar network, determine the false alarm target, identify a real target, and further improve a probability and reliability of detecting the correct target.

It may be understood that, in this embodiment of this application, due to existence of an error, if the difference between the energy value of the target on the first distance-velocity spectrum and the energy value of the target on the second distance-velocity spectrum is less than the first threshold, the target may be considered as the real target. For example, if the first threshold is 1, and the difference between the energy value of the target on the first distance-velocity spectrum and the energy value of the target on the second distance-velocity spectrum is 0.5, the target may be considered as the real target.

Figure 16:
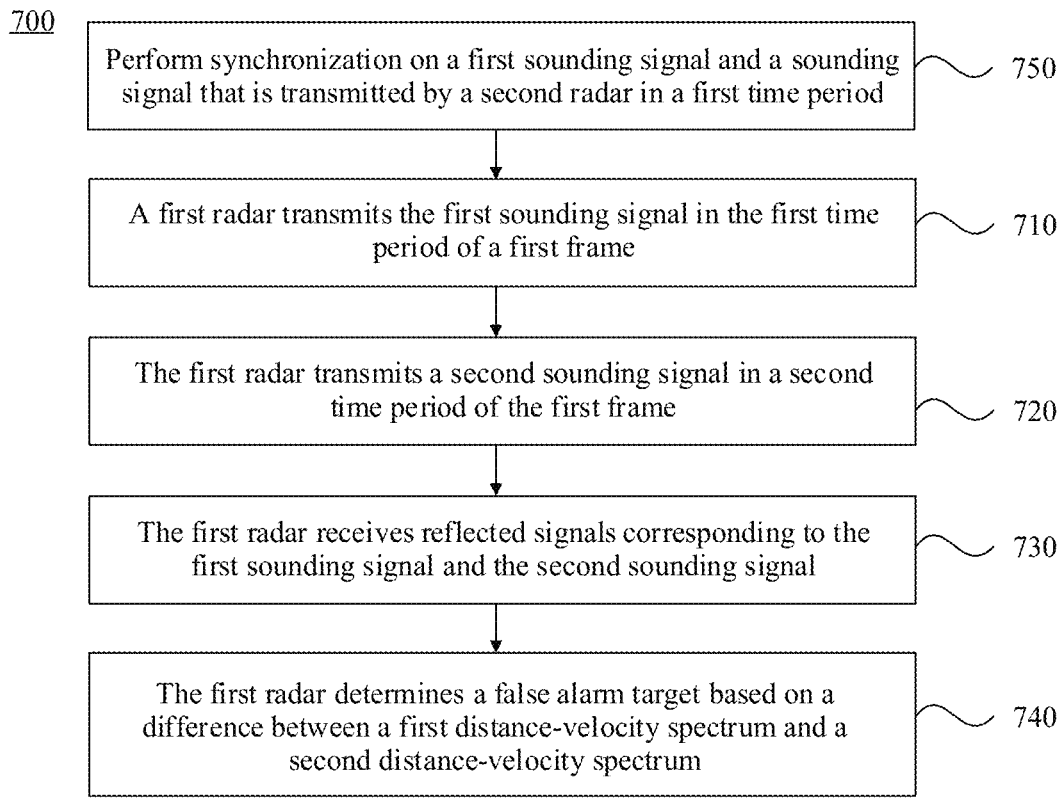
FIG. 16 is a schematic diagram of a signal detection method according to another embodiment of this application.

Optionally, in some embodiments, as shown in FIG. 16, the method 700 may further include step 750.

Step 750: Perform synchronization on the first sounding signal and the sounding signal that is transmitted by the second radar in the first time period, so that a difference between a transmitting start time of the first sounding signal and a transmitting start time of the sounding signal that is transmitted by the second radar is less than or equal to a second threshold.

The second threshold in this embodiment of this application may be set based on factory settings, or may be adjusted based on a requirement. This is not limited.

In this embodiment of this application, before the first radar transmits the first sounding signal and the second radar transmits the sounding signal that is transmitted in the first time period, the first sounding signal and the sounding signal that is transmitted by the second radar in the first time period may be synchronized.

In this embodiment of this application, performing synchronization on the first sounding signal and the sounding signal that is transmitted by the second radar in the first time period may mean that the first radar and the second radar transmit sounding signals at a same moment, that is, the first radar and the second radar separately transmit sounding signals at a same moment; or may mean that the first radar and the second radar transmit sounding signals at an interval of the second threshold. It is assumed that the second threshold is 1 ms, the first radar transmits the first sounding signal at a first moment, and the second radar may transmit the sounding signal within 1 ms after the first moment.

It should be noted that synchronization on the first sounding signal and the sounding signal that is transmitted by the second radar in the first time period may be performed by the first radar, or may be performed by an additional synchronization apparatus. This is not limited.

If synchronization is performed by the additional synchronization apparatus, the synchronization apparatus may obtain precise time information, and sounding signals transmitted by a plurality of radars in the first time period may be synchronized based on the time information, so that waveforms of the signals transmitted by the plurality of radars at a start moment of the first time period do not have a time difference, or the time difference is less than or equal to the second threshold.

According to the solution provided in this embodiment of this application, the first sounding signal transmitted by the first radar and the sounding signal transmitted by the second radar in the first time period are synchronized. This can further improve a probability and reliability of detecting the correct target.

Optionally, in some embodiments, a guard period between the first sounding signal and the second sounding signal is greater than or equal to a third threshold.

The third threshold in this embodiment of this application may be set based on factory settings, or may be adjusted based on a requirement. This is not limited.

In this embodiment of this application, as shown in (b) in FIG. 10, a guard interval shown in the figure may be the guard period in this embodiment of this application, and the guard period may be greater than or equal to the third threshold.

Specifically, it is assumed that the plurality of radars in (b) in FIG. 10 send sounding signals at different moments. For example, the radar 110 sends the first sounding signal at the first moment, and the radar 120, the radar 130, and the radar 140 each transmit a sounding signal within is after the first moment. In this case, at the last moment in a period T1, a signal finally transmitted by the radar 110 is not transmitted at the same time as signals finally transmitted by the radar 120, the radar 130, and the radar 140. To enable the radar 110, the radar 120, the radar 130, and the radar 140 to synchronously transmit sounding signals at a start moment of the time period T2, a guard interval may be set between the time period T1 and the time period T2. This can ensure that the sounding signals transmitted by the four radars at the start moment of the time period T2 are synchronized, and further improve a probability and reliability of detecting the correct target.

In the solution provided in this embodiment of this application, because the guard period between the first sounding signal and the second sounding signal is greater than or equal to the third threshold, this can further improve a probability and reliability of detecting the correct target.

Optionally, in some embodiments, duration of the first time period and duration of the second time period are the same or different.

In this embodiment of this application, the duration of the first time period and the duration of the second time period may be the same or may be different.

It may be understood that whether the duration of the first time period and the duration of the second time period are the same or different can be applied to this embodiment of this application. A distance-velocity spectrum in this embodiment of this application is obtained based on a reflected signal and a corresponding sounding signal. For example, the first distance-velocity spectrum is obtained based on the first sounding signal and the first reflected signal, the second distance-velocity spectrum is obtained based on the second sounding signal and the second reflected signal, the first sounding signal is a sounding signal transmitted by the first radar in the first time period, and the second sounding signal is a sounding signal transmitted by the first radar in the second time period. Therefore, whether the duration of the first time period and the duration of the second time period are the same may be applied to this application. This is not specifically limited in this application.

The foregoing describes in detail the method embodiments of this application with reference to FIG. 1 to FIG. 16. The following describes apparatus embodiments of this application with reference to FIG. 17 to FIG. 20. The apparatus embodiments correspond to the method embodiments. Therefore, for a part that is not described in detail, refer to the method embodiments.

Figure 17:
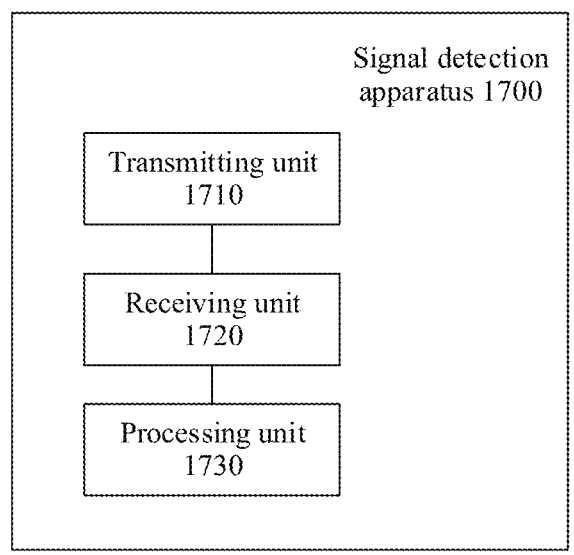
FIG. 17 is a schematic diagram of a signal detection apparatus according to an embodiment of this application.

FIG. 17 shows a signal detection apparatus 1700 according to an embodiment of this application. The apparatus 1700 may include a transmitting unit 1710, a receiving unit 1720, and a processing unit 1730.

The transmitting unit 1710 is configured to transmit a first sounding signal in a first time period of a first frame, and transmit a second sounding signal in a second time period of the first frame.

The receiving unit 1720 is configured to receive reflected signals corresponding to the first sounding signal and the second sounding signal.

The processing unit 1730 is configured to determine a false alarm target based on a difference between a first distance-velocity spectrum and a second distance-velocity spectrum.

The second sounding signal is a signal obtained through first phase code modulation based on the first sounding signal. The first distance-velocity spectrum is obtained based on a first reflected signal corresponding to the first sounding signal, and the second distance-velocity spectrum is obtained based on a second reflected signal corresponding to the second sounding signal.

The transmitting unit 1710 and the receiving unit 1720 may be respectively the transmit antenna 1140 and the receive antenna 1150 in FIG. 11. The processing unit 1730 may include the frequency mixer 1160, the analog/digital converter 1170, and the assessment unit 1180 in FIG. 11.

Optionally, in some embodiments, the first time period is before the second time period in a time sequence, or the first time period is after the second time period in a time sequence.

Optionally, in some embodiments, the first time period and the second time period are shorter than or equal to a frame length of the first frame.

Optionally, in some embodiments, the first sounding signal is the same as a sounding signal transmitted by a second radar in the first time period. The second sounding signal is different from a sounding signal transmitted by the second radar in the second time period. The sounding signal transmitted by the second radar in the second time period is obtained by performing second phase code modulation on the sounding signal transmitted by the second radar in the first time period.

Optionally, in some embodiments, the receiving unit 1720 is further configured to receive reflected signals corresponding to sounding signals transmitted by the second radar in the first time period and the second time period.

Optionally, in some embodiments, there are a plurality of second radars.

Optionally, in some embodiments, the first distance-velocity spectrum is obtained based on the first reflected signal corresponding to the first sounding signal and a reflected signal corresponding to a sounding signal transmitted by at least one second radar in the first time period. The second distance-velocity spectrum is obtained based on the second reflected signal corresponding to the second sounding signal and a reflected signal corresponding to a sounding signal transmitted by the at least one second radar in the second time period.

Optionally, in some embodiments, the second sounding signal and the sounding signal that is transmitted by the second radar in the second time period are mutually orthogonal or quasi-orthogonal phase code modulation signals.

Optionally, in some embodiments, before determining the false alarm target based on the difference between the first distance-velocity spectrum and the second distance-velocity spectrum, the processing unit 1730 is further configured to: perform first-dimensional Fourier transform processing on the second reflected signal; perform, based on a code phase of the second sounding signal, phase code demodulation on the second reflected signal obtained through first-dimensional Fourier transform processing; and perform second-dimensional Fourier transform processing on the second reflected signal obtained through the phase code demodulation, to obtain the second distance-velocity spectrum.

Optionally, in some embodiments, if the first sounding signal is a signal on which phase code modulation is not performed, before determining the false alarm target based on the difference between the first distance-velocity spectrum and the second distance-velocity spectrum, the processing unit 1730 is further configured to: perform first-dimensional Fourier transform processing on the first reflected signal; and perform second-dimensional Fourier transform processing on the first reflected signal obtained through first-dimensional Fourier transform processing, to obtain the first distance-velocity spectrum.

Optionally, in some embodiments, if the first sounding signal and the sounding signal that is transmitted by the second radar in the first time period are signals on which same phase code modulation is performed, before determining the false alarm target based on the difference between the first distance-velocity spectrum and the second distance-velocity spectrum, the processing unit 1730 is further configured to: perform first-dimensional Fourier transform processing on the first reflected signal; perform, based on a code phase of the first sounding signal, phase code demodulation on the first reflected signal obtained through first-dimensional Fourier transform processing; and perform second-dimensional Fourier transform processing on the first reflected signal obtained through the phase code demodulation, to obtain the first distance-velocity spectrum.

Optionally, in some embodiments, the processing unit 1730 is further configured to determine a first target as the false alarm target, where a difference between an energy value of the first target on the first distance-velocity spectrum and an energy value of the first target on the second distance-velocity spectrum is greater than or equal to a first threshold.

Optionally, in some embodiments, the processing unit 1730 is further configured to perform synchronization on the first sounding signal and the sounding signal that is transmitted by the second radar in the first time period, so that a difference between a transmitting start time of the first sounding signal and a transmitting start time of the sounding signal that is transmitted by the second radar is less than or equal to a second threshold.

Optionally, in some embodiments, a guard period between the first sounding signal and the second sounding signal is greater than or equal to a third threshold.

Optionally, in some embodiments, duration of the first time period and duration of the second time period are the same or different.

Figure 18:
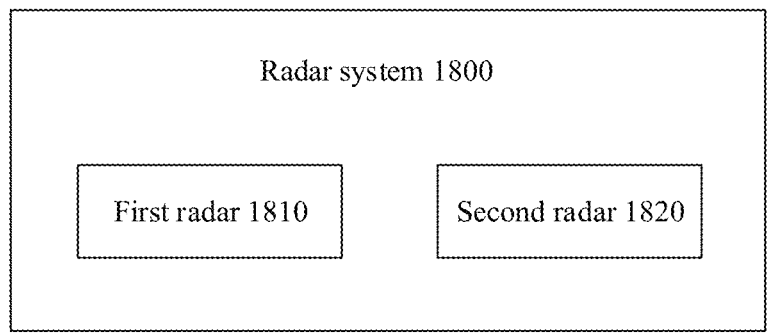
FIG. 18 is a schematic diagram of a radar system according to an embodiment of this application.

An embodiment of this application further provides a radar system 1800. As shown in FIG. 18, the radar system 1800 may include a first radar 1810 and a second radar 1820.

The first radar 1810 is configured to: transmit a first sounding signal in a first time period of a first frame; transmit a second sounding signal in a second time period of the first frame; receive reflected signals, where the reflected signals include reflected signals corresponding to the first sounding signal and the second sounding signal, and receive reflected signals corresponding to sounding signals that are transmitted by the second radar 1820 in the first time period and the second time period; and determine a false alarm target based on a difference between a first distance-velocity spectrum and a second distance-velocity spectrum. The second sounding signal is a signal obtained through first-phase code modulation based on the first sounding signal. The first distance-velocity spectrum is obtained based on a first reflected signal corresponding to the first sounding signal and a reflected signal corresponding to a sounding signal that is transmitted by the second radar 1820 in the first time period, and the second distance-velocity spectrum is obtained based on a second reflected signal corresponding to the second sounding signal and a reflected signal corresponding to a sounding signal that is transmitted by the second radar 1820 in the second time period.

Optionally, in some embodiments, the first time period is before the second time period in a time sequence, or the first time period is after the second time period in a time sequence.

Optionally, in some embodiments, the first time period and the second time period are shorter than or equal to a frame length of the first frame.

Optionally, in some embodiments, the first sounding signal is the same as a sounding signal transmitted by the second radar 1820 in the first time period. The second sounding signal is different from the sounding signal transmitted by the second radar 1820 in the second time period. The sounding signal transmitted by the second radar 1820 in the second time period is obtained by performing second phase code modulation on the sounding signal transmitted by the second radar 1820 in the first time period.

Optionally, in some embodiments, there are a plurality of second radars 1820.

Optionally, in some embodiments, the second sounding signal and the sounding signal that is transmitted by the second radar 1820 in the second time period are mutually orthogonal or quasi-orthogonal phase code modulation signals.

Optionally, in some embodiments, before determining the false alarm target based on the difference between the first distance-velocity spectrum and the second distance-velocity spectrum, the first radar 1810 is further configured to: perform first-dimensional Fourier transform processing on the second reflected signal; perform, based on a code phase of the second sounding signal, phase code demodulation on the second reflected signal obtained through first-dimensional Fourier transform processing; and perform second-dimensional Fourier transform processing on the second reflected signal obtained through the phase code demodulation, to obtain the second distance-velocity spectrum.

Optionally, in some embodiments, if the first sounding signal is a signal on which phase code modulation is not performed, before determining the false alarm target based on the difference between the first distance-velocity spectrum and the second distance-velocity spectrum, the first radar 1810 is further configured to: perform first-dimensional Fourier transform processing on the first reflected signal; and perform second-dimensional Fourier transform processing on the first reflected signal obtained through first-dimensional Fourier transform processing, to obtain the first distance-velocity spectrum.

Optionally, in some embodiments, if the first sounding signal and the sounding signal that is transmitted by the second radar 1820 in the first time period are signals on which same phase code modulation is performed, before determining the false alarm target based on the difference between the first distance-velocity spectrum and the second distance-velocity spectrum, the first radar 1810 is further configured to: perform first-dimensional Fourier transform processing on the first reflected signal; perform, based on a code phase of the first sounding signal, phase code demodulation on the first reflected signal obtained through first-dimensional Fourier transform processing; and perform second-dimensional Fourier transform processing on the first reflected signal obtained through the phase code demodulation, to obtain the first distance-velocity spectrum.

Optionally, in some embodiments, the first radar 1810 is further configured to determine a first target as the false alarm target, where a difference between an energy value of the first target on the first distance-velocity spectrum and an energy value of the first target on the second distance-velocity spectrum is greater than or equal to a first threshold.

Optionally, in some embodiments, the first radar 1810 is further configured to perform synchronization on the first sounding signal and the sounding signal that is transmitted by the second radar 1820 in the first time period, so that a difference between a transmitting start time of the first sounding signal and a transmitting start time of the sounding signal that is transmitted by the second radar 1820 is less than or equal to a second threshold.

Optionally, in some embodiments, a guard period between the first sounding signal and the second sounding signal is greater than or equal to a third threshold.

Optionally, in some embodiments, duration of the first time period and duration of the second time period are the same or different.

Figure 19:
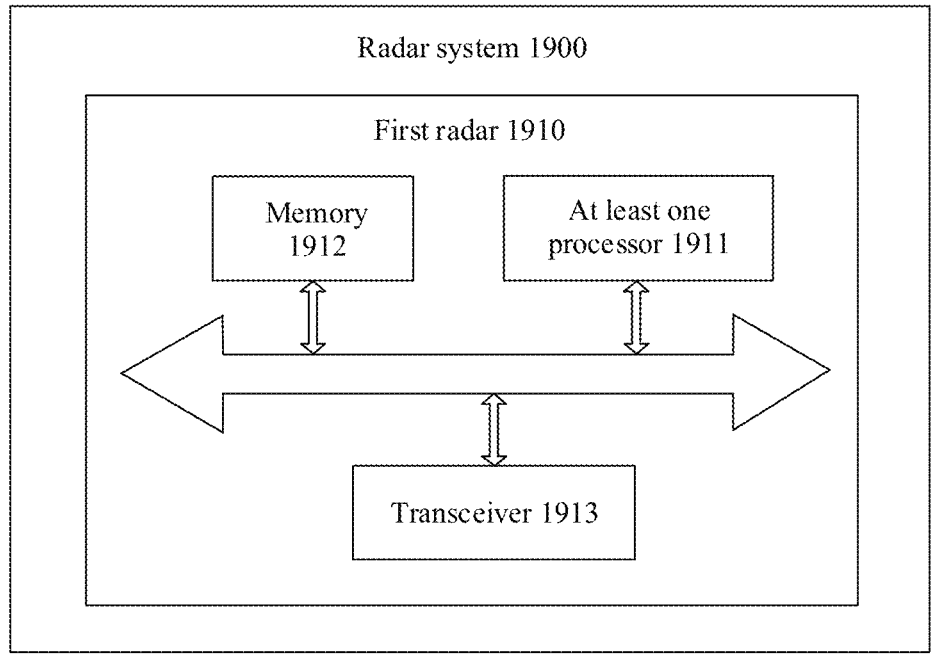
FIG. 19 is a schematic diagram of a radar system according to another embodiment of this application.

An embodiment of this application further provides a radar system 1900. As shown in FIG. 19, a first radar 1910 in the radar system 1900 may include at least one processor 1911 and a memory 1912. The memory is configured to store a computer program. The at least one processor 1911 is configured to invoke the computer program stored in the memory and run the computer program, to perform any method described above.

The at least one processor 1911 may invoke a computer program from the memory 1912 and run the computer program, to implement the method in embodiments of this application.

The memory 1912 may be an independent component independent of the at least one processor 1911, or may be integrated into the at least one processor 1911.

Optionally, as shown in FIG. 19, the first radar 1910 in the radar system 1900 may further include a transceiver 1913.

Figure 20:
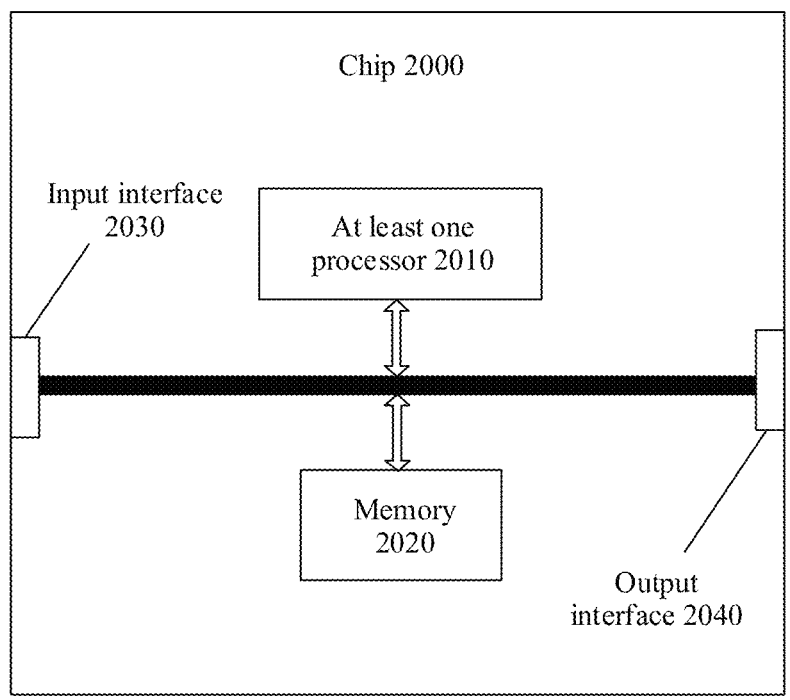
FIG. 20 is a schematic diagram of a structure of a chip according to an embodiment of this application.

FIG. 20 is a schematic diagram of a structure of a chip according to an embodiment of this application. The chip 2000 shown in FIG. 20 includes at least one processor 2010. The at least one processor 2010 may invoke a computer program from a memory and run the computer program, to implement the method in embodiments of this application.

Optionally, as shown in FIG. 20, the chip 2000 may further include a memory 2020. The at least one processor 2010 may invoke a computer program from the memory 2020 and run the computer program, to implement the method in embodiments of this application.

The memory 2020 may be an independent component independent of the at least one processor 2010, or may be integrated into the at least one processor 2010.

Optionally, the chip 2000 may further include an input interface 2030. The at least one processor 2010 may control the input interface 2030 to communicate with another device or chip, and specifically, may obtain information or data sent by the another device or chip.

Optionally, the chip 2000 may further include an output interface 2040. The at least one processor 2010 may control the output interface 2040 to communicate with another device or chip, and specifically, may output information or data to the another device or chip.

Optionally, the chip may be used in the first radar in embodiments of this application, and the chip may implement corresponding procedures implemented by the first radar in the methods in embodiments of this application. For brevity, details are not described herein again.

It should be understood that the chip in this embodiment of this application may also be referred to as a system-level chip, a system chip, a chip system, a system on chip, or the like.

It should be understood that the processor in this embodiment of this application may be an integrated circuit chip, and has a signal processing capability. In an implementation process, steps in the foregoing method embodiments can be implemented by using a hardware integrated logical circuit in the processor, or by using instructions in a form of software. The foregoing processor may be a general-purpose processor, a digital signal processor (digital signal processor, DSP), an application-specific integrated circuit (application-specific integrated circuit, ASIC), a field programmable gate array (field programmable gate array, FPGA) or another programmable logic device, a discrete gate or transistor logic device, or a discrete hardware component. It may implement or perform the methods, the steps, and logical block diagrams that are disclosed in embodiments of this application. The general-purpose processor may be a microprocessor, or the processor may be any conventional processor or the like. Steps of the methods disclosed with reference to embodiments of this application may be directly executed and accomplished by using a hardware decoding processor, or may be executed and accomplished by using a combination of hardware and software modules in the decoding processor. A software module may be located in a mature storage medium in the art, such as a random access memory, a flash memory, a read-only memory, a programmable read-only memory, an electrically erasable programmable memory, or a register. The storage medium is located in the memory, and a processor reads information in the memory and completes the steps in the foregoing methods in combination with hardware of the processor.

It may be understood that the memory in this embodiment of this application may be a volatile memory or a nonvolatile memory, or may include a volatile memory and a nonvolatile memory. The nonvolatile memory may be a read-only memory (read-only memory, ROM), a programmable read-only memory (programmable rom, PROM), an erasable programmable read-only memory (erasable PROM, EPROM), an electrically erasable programmable read-only memory (electrically EPROM, EEPROM), or a flash memory. The volatile memory may be a random access memory (random access memory, RAM), used as an external cache. By way of example, and not limitation, RAMs in many forms may be used, for example, a static random access memory (static RAM, SRAM), a dynamic random access memory (dynamic RAM, DRAM), a synchronous dynamic random access memory (synchronous DRAM, SDRAM), a double data rate synchronous dynamic random access memory (double data rate SDRAM, DDR SDRAM), an enhanced synchronous dynamic random access memory (enhanced SDRAM, ESDRAM), a synchlink dynamic random access memory (synchlink DRAM, SLDRAM), and a direct rambus random access memory (direct rambus RAM, DR RAM). It should be noted that the memory of the systems and methods described in this specification includes but is not limited to these memories and any memory of another proper type.

It should be understood that the memory is an example but not a limitation. For example, the memory in this embodiment of this application may alternatively be a static random access memory (static RAM, SRAM), a dynamic random access memory (dynamic RAM, DRAM), a synchronous dynamic random access memory (synchronous DRAM, SDRAM), a double data rate synchronous dynamic random access memory (double data rate SDRAM, DDR SDRAM), an enhanced synchronous dynamic random access memory (enhanced SDRAM, ESDRAM), a synchlink dynamic random access memory (synchlink DRAM, SLDRAM), and a direct rambus random access memory (direct rambus RAM, DR RAM). In other words, the memory described in this embodiment of this application is intended to include, but is not limited to, these memories and any memory of another proper type.

An embodiment of this application further provides a computer-readable storage medium, configured to store a computer program.

Optionally, the computer-readable storage medium may be used in the first radar in embodiments of this application, and the computer program enables a computer to implement the corresponding procedures implemented by the first radar in the methods in embodiments of this application. For brevity, details are not described herein again.

An embodiment of this application further provides a computer program product, including computer program instructions.

Optionally, the computer program product may be used in the first radar in embodiments of this application, and the computer program instructions enable a computer to implement the corresponding procedures implemented by the first radar in the methods in embodiments of this application. For brevity, details are not described herein again.

An embodiment of this application further provides a computer program.

Optionally, the computer program may be used in the first radar in embodiments of this application, and when the computer program is run on a computer, the computer is enabled to implement the corresponding procedures implemented by the first radar in the methods in embodiments of this application. For brevity, details are not described herein again.

An embodiment of this application further provides an intelligent device. The intelligent device includes the foregoing signal detection apparatus 1700.

The intelligent device may be an unmanned aerial vehicle, a roadside unit, or the like.

An embodiment of this application further provides a transportation tool, and the transportation tool includes the foregoing signal detection apparatus 1700.

The transportation tool may be a vehicle or the like.

A person of ordinary skill in the art may be aware that, in combination with the examples described in embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In the several embodiments provided in this application, it should be understood that the disclosed system, apparatus, and method may be implemented in other manners. For example, the described apparatus embodiments are merely examples. For example, division into the units is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of embodiments.

In addition, functional units in embodiments of this application may be integrated into one processing unit, each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of this application essentially, or the part contributing to the current technology, or some of the technical solutions may be implemented in a form of a software product. The computer software product is stored in a storage medium, and includes several instructions for instructing a computer device (which may be a personal computer, a server, or a radar) to perform all or some of the steps of the methods described in embodiments of this application. The foregoing storage medium includes any medium that can store program code, such as a USB flash drive, a removable hard disk, a ROM, a RAM, a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A signal detection method, comprising:
    transmitting, by a first radar, a first sounding signal in a first time period of a first frame;
    transmitting, by the first radar, a second sounding signal in a second time period of the first frame;
    receiving, by the first radar, reflected signals corresponding to the first sounding signal and the second sounding signal;
    performing, by the first radar, first-dimensional Fourier transform processing on a second reflected signal;
    performing, by the first radar based on a code phase of the second sounding signal, phase code demodulation on the second reflected signal obtained through first-dimensional Fourier transform processing;
    performing, by the first radar, second-dimensional Fourier transform processing on the second reflected signal obtained through the phase code demodulation, to obtain a second distance-velocity spectrum; and
    determining, by the first radar, a false alarm target based on a difference between a first distance-velocity spectrum and the second distance-velocity spectrum, wherein
    the second sounding signal is a signal obtained through first phase code modulation based on the first sounding signal, the first distance-velocity spectrum is obtained based on a first reflected signal corresponding to the first sounding signal, and the second distance-velocity spectrum is obtained based on the second reflected signal corresponding to the second sounding signal.

2. The method according to claim 1, wherein the first time period is before the second time period in a time sequence, or
    the first time period is after the second time period in a time sequence.

3. The method according to claim 1, wherein the first time period and the second time period are shorter than or equal to a frame length of the first frame.

4. The method according to claim 1, wherein the first sounding signal is the same as a sounding signal transmitted by a second radar in the first time period; the second sounding signal is different from a sounding signal transmitted by the second radar in the second time period; and the sounding signal transmitted by the second radar in the second time period is obtained by performing second phase code modulation on the sounding signal transmitted by the second radar in the first time period.

5. The method according to claim 4, wherein the method further comprises:
    receiving, by the first radar, reflected signals corresponding to sounding signals that are transmitted by the second radar in the first time period and the second time period.

6. The method according to claim 4, wherein the second radar is one of a plurality of second radars, and the first sounding signal is the same as a sounding signal transmitted by each of the plurality of second radars, and the second sounding signal is different from a sounding signal transmitted by each of the plurality of second radars.

7. The method according to claim 4, wherein the first distance-velocity spectrum is obtained based on the first reflected signal corresponding to the first sounding signal and a reflected signal corresponding to a sounding signal transmitted by at least one second radar in the first time period; and
    the second distance-velocity spectrum is obtained based on the second reflected signal corresponding to the second sounding signal and a reflected signal corresponding to a sounding signal transmitted by the at least one second radar in the second time period.

8. The method according to claim 4, wherein the second sounding signal and the sounding signal that is transmitted by the second radar in the second time period are mutually orthogonal or quasi-orthogonal phase code modulation signals.

9. The method according to claim 1, wherein when the first sounding signal is a signal on which phase code modulation is not performed, before the determining, by the first radar, a false alarm target based on a difference between a first distance-velocity spectrum and a second distance-velocity spectrum, the method further comprises:
performing, by the first radar, first-dimensional Fourier transform processing on the first reflected signal; and
performing, by the first radar, second-dimensional Fourier transform processing on the first reflected signal obtained through first-dimensional Fourier transform processing, to obtain the first distance-velocity spectrum.

10. The method according to claim 4, wherein when the first sounding signal and the sounding signal that is transmitted by the second radar in the first time period are signals on which same phase code modulation is performed, before the determining, by the first radar, a false alarm target based on a difference between a first distance-velocity spectrum and a second distance-velocity spectrum, the method further comprises:
performing, by the first radar, first-dimensional Fourier transform processing on the first reflected signal;
performing, by the first radar based on a code phase of the first sounding signal, phase code demodulation on the first reflected signal obtained through first-dimensional Fourier transform processing; and
performing, by the first radar, second-dimensional Fourier transform processing on the first reflected signal obtained through the phase code demodulation, to obtain the first distance-velocity spectrum.

11. The method according to claim 1, wherein the determining, by the first radar, a false alarm target based on a difference between a first distance-velocity spectrum and a second distance-velocity spectrum comprises:
determining, by the first radar, a first target as the false alarm target, wherein a difference between an energy value of the first target on the first distance-velocity spectrum and an energy value of the first target on the second distance-velocity spectrum is greater than or equal to a first threshold.

12. The method according to claim 4, wherein the method further comprises:
performing synchronization on the first sounding signal and the sounding signal that is transmitted by the second radar in the first time period, so that a difference between a transmitting start time of the first sounding signal and a transmitting start time of the sounding signal that is transmitted by the second radar is less than or equal to a second threshold.

13. A first radar, comprising:
at least one processor; and
one or more memories coupled to the at least one processor and storing programming instructions for execution by the at least one processor to cause the first radar to:
transmit a first sounding signal in a first time period of a first frame;
transmit a second sounding signal in a second time period of the first frame;
receive reflected signals corresponding to the first sounding signal and the second sounding signal;
perform first-dimensional Fourier transform processing on a second reflected signal;
perform based on a code phase of the second sounding signal, phase code demodulation on the second reflected signal obtained through first-dimensional Fourier transform processing;
perform second-dimensional Fourier transform processing on the second reflected signal obtained through the phase code demodulation, to obtain a second distance-velocity spectrum; and
determine a false alarm target based on a difference between a first distance-velocity spectrum and the second distance-velocity spectrum, wherein
the second sounding signal is a signal obtained through first phase code modulation based on the first sounding signal, the first distance-velocity spectrum is obtained based on a first reflected signal corresponding to the first sounding signal, and the second distance-velocity spectrum is obtained based on the second reflected signal corresponding to the second sounding signal.

14. The first radar according to claim 13, wherein the first time period is before the second time period in a time sequence, or the first time period is after the second time period in a time sequence.

15. The first radar according to claim 13, wherein the first time period and the second time period are shorter than or equal to a frame length of the first frame.

16. The first radar according to claim 13, wherein the first sounding signal is the same as a sounding signal transmitted by a second radar in the first time period; the second sounding signal is different from a sounding signal transmitted by the second radar in the second time period; and the sounding signal transmitted by the second radar in the second time period is obtained by performing second phase code modulation on the sounding signal transmitted by the second radar in the first time period.

17. The first radar according to claim 16, wherein the one or more memories store programming instructions for execution by the at least one processor to cause the first radar to receive reflected signals corresponding to sounding signals that are transmitted by the second radar in the first time period and the second time period.

18. The first radar according to claim 16, wherein the first distance-velocity spectrum is obtained based on the first reflected signal corresponding to the first sounding signal and a reflected signal corresponding to a sounding signal transmitted by at least one second radar in the first time period; and
the second distance-velocity spectrum is obtained based on the second reflected signal corresponding to the second sounding signal and a reflected signal corresponding to a sounding signal transmitted by the at least one second radar in the second time period.

19. The first radar according to claim 16, wherein the second sounding signal and the sounding signal that is transmitted by the second radar in the second time period are mutually orthogonal or quasi-orthogonal phase code modulation signals.

20. The first radar according to claim 13, wherein the first sounding signal is a signal on which phase code modulation is not performed, and the one or more memories store programming instructions for execution by the at least one processor to cause the first radar to:
before the determining a false alarm target based on a difference between a first distance-velocity spectrum and a second distance-velocity spectrum:

perform first-dimensional Fourier transform processing on the first reflected signal; and perform second-dimensional Fourier transform processing on the first reflected signal obtained through first-dimensional Fourier transform processing, to obtain the first distance-velocity spectrum.

21. The first radar according to claim 13, wherein the one or more memories store programming instructions for execution by the at least one processor to cause the first radar to:

determine a first target as the false alarm target, wherein a difference between an energy value of the first target on the first distance-velocity spectrum and an energy value of the first target on the second distance-velocity spectrum is greater than or equal to a first threshold.

* * * * *